US012652511B2

(12) United States Patent
Sekioka

(10) Patent No.: US 12,652,511 B2
(45) Date of Patent: Jun. 9, 2026

(54) SURVEILLANCE SYSTEM

(71) Applicant: Hidehiko Sekioka, Fukuoka (JP)

(72) Inventor: Hidehiko Sekioka, Fukuoka (JP)

(73) Assignee: Hidehiko Sekioka, Fukuoka (JP)

( * ) Notice: Subject to any disclaimer, the term of this patent is extended or adjusted under 35 U.S.C. 154(b) by 51 days.

(21) Appl. No.: 18/724,599

(22) PCT Filed: Jun. 30, 2022

(86) PCT No.: PCT/JP2022/026368
§ 371 (c)(1),
(2) Date: Jun. 26, 2024

(87) PCT Pub. No.: WO2023/127183
PCT Pub. Date: Jul. 6, 2023

(65) Prior Publication Data
US 2025/0071517 A1 Feb. 27, 2025

(30) Foreign Application Priority Data
Dec. 28, 2021 (JP) ................................. 2021-215224

(51) Int. Cl.
| | |
|---|---|
| *G08B 21/00* | (2006.01) |
| *G08B 21/02* | (2006.01) |
| *G08B 25/10* | (2006.01) |
| *H04W 4/029* | (2018.01) |

(52) U.S. Cl.
CPC ............ *H04W 4/029* (2018.02); *G08B 21/02* (2013.01); *G08B 25/10* (2013.01)

(58) Field of Classification Search
CPC ....... H04W 4/029; H04W 4/38; H04W 40/12;

H04W 88/04; G08B 21/02; G08B 25/10;
G08B 25/009; G08B 25/01; G08B 25/04;
H04M 1/00; H04M 11/00
USPC ........................................................ 340/686.1
See application file for complete search history.

(56) References Cited

U.S. PATENT DOCUMENTS

| | | | | |
|---|---|---|---|---|
| 6,300,863 | B1 * | 10/2001 | Cotichini | ................ H04L 41/28 |
| | | | | 709/200 |
| 2006/0009191 | A1 * | 1/2006 | Malone, III | ............ H04W 4/90 |
| | | | | 455/11.1 |
| 2008/0311894 | A1 * | 12/2008 | Klein | ...................... H04L 41/22 |
| | | | | 455/414.2 |

(Continued)

FOREIGN PATENT DOCUMENTS

| | | |
|---|---|---|
| JP | 2017135583 | 8/2017 |
| JP | 2017209176 | 11/2017 |

(Continued)

OTHER PUBLICATIONS

"International Search Report (Form PCT/ISA/210) of PCT/JP2022/026368", mailed on Sep. 27, 2022, with English translation thereof, pp. 1-4.

*Primary Examiner* — Tai T Nguyen
(74) *Attorney, Agent, or Firm* — JCIPRNET

(57) ABSTRACT

A surveillance system can realize suitable tracking. A tracking band surveillance system composed of a tracking band 1, a smartphone 2, and a server 3 starts searching for free Wi-Fi and transmits data from the tracking band 1 to the server 3 via the searched free Wi-Fi on condition that interconnection between the tracking band 1 and the smartphone 2 has become impossible.

15 Claims, 18 Drawing Sheets

(56) References Cited

U.S. PATENT DOCUMENTS

| | | | | |
|---|---|---|---|---|
| 2012/0032844 A1* | 2/2012 | Mo | ........................ | G01S 5/0027 |
| | | | | 342/357.46 |
| 2016/0140829 A1* | 5/2016 | Romanoff | .............. | G06Q 10/06 |
| | | | | 340/540 |
| 2023/0016774 A1* | 1/2023 | Link, II | .................. | G01S 11/06 |
| 2023/0066232 A1* | 3/2023 | Caro | ................. | H04B 7/18517 |

FOREIGN PATENT DOCUMENTS

| | | |
|---|---|---|
| JP | 2017536709 | 12/2017 |
| JP | 2018063477 | 4/2018 |
| JP | 2021096828 | 6/2021 |
| JP | 7111403 | 8/2022 |
| JP | 7232556 | 3/2023 |
| WO | 2019163130 | 8/2019 |

* cited by examiner

SURVEILLANCE SYSTEM

CROSS-REFERENCE TO RELATED APPLICATION

This application is a 371 application of the International PCT application serial no. PCT/JP2022/026368, filed on Jun. 30, 2022, which claims the priority benefits of Japan Patent Application No. 2021-215224, filed on Dec. 28, 2021. The entirety of each of the above-mentioned patent applications is hereby incorporated by reference herein and made a part of this specification.

TECHNICAL FIELD

The present invention relates to a surveillance system. More specifically, the present invention relates to a surveillance system that can realize suitable tracking more sufficiently.

RELATED ART

A tracking band can contribute to society, such as avoiding the lonely death of the elderly, and tracking the trajectory of wandering elderly to ensure their safety, by suitably utilizing various information collected by the tracking band.

Thus, the inventor of the present invention has proposed a technique for realizing a suitable tracking band monitoring (see Patent Literature 1).

CITATION LIST

Patent Literature

Patent Literature 1: Japanese Laid-open No. 2021-96828

SUMMARY OF INVENTION

Problem to Be Solved by Invention

Meanwhile, there are various targets to be monitored by the tracking band and the situations thereof also vary. Thus, the technique described in Patent Literature 1 alone may be insufficient to realize suitable tracking.

Accordingly, the present invention has been made in view of the foregoing point, and an object thereof is to provide a surveillance system that can realize suitable tracking more sufficiently.

Means for Solving Problem

In order to achieve the foregoing object, a surveillance system of the present invention is a surveillance system including a predetermined device, a server, and a portable relay device that relays communications between the device and the server, wherein the device has a detection means that acquires predetermined monitoring information from a monitoring target wearing the device, and a monitoring information transmission means that transmits the monitoring information acquired by the detection means to the server via the relay device when interconnected with the relay device and that starts searching for an alternative network, which is an open network different from a network to the server, and transmits the monitoring information acquired by the detection means to the server by using the searched alternative network without going through the relay device when interconnection with the relay device is not possible, wherein the relay device has a relay means that receives transmission data from the device and the server and transmits the transmission data to the server and the device respectively, and wherein the server has a control signal transmission means that transmits a control signal for controlling the device to the device via the relay device, and is configured to, on condition that position information of the relay device associated with the monitoring target is outside a tracking area set corresponding to the monitoring target, be capable of displaying on a management screen that the position information is outside the tracking area.

Further, the surveillance system of the present invention is a surveillance system including a predetermined device, a server, and a portable relay device that relays communications between the device and the server, wherein the device has a detection means that acquires predetermined monitoring information from a monitoring target wearing the device, and a monitoring information transmission means that transmits the monitoring information acquired by the detection means to the server via the relay device when interconnected with the relay device and that starts searching for an alternative network, which is an open network different from a network to the server, and transmits the monitoring information acquired by the detection means to the server by using the searched alternative network without going through the relay device when interconnection with the relay device is not possible, wherein the relay device has a relay means that receives transmission data from the device and the server and transmits the transmission data to the server and the device respectively and that transmits an attention signal to the server on condition that the probability that the interconnection with the device becomes impossible has increased, and wherein the server has a control signal transmission means that transmits a control signal for controlling the device to the device via the relay device, and is configured to be capable of displaying on a management screen that there is a high probability that the interconnection between the device and the relay device becomes impossible on condition that the attention signal has been received from the relay device.

Furthermore, the surveillance system of the present invention is a surveillance system including a predetermined device, a server, and a portable relay device that relays communications between the device and the server, wherein the device has a detection means that acquires predetermined monitoring information from a monitoring target wearing the device, and a monitoring information transmission means that transmits the monitoring information acquired by the detection means to the server via the relay device when interconnected with the relay device and that starts searching for an alternative network, which is an open network different from a network to the server, and transmits the monitoring information acquired by the detection means to the server by using the searched alternative network without going through the relay device when interconnection with the relay device is not possible, and the device is also configured to perform a predetermined attention operation on condition that a predetermined attention signal has been received, wherein the relay device has a relay means that receives transmission data from the device and the server and transmits the transmission data to the server and the device respectively and that transmits the attention signal to the device on condition that the probability that the interconnection with the device becomes impossible has increased, and wherein the server has a control signal transmission means that transmits a control signal for controlling the device to the device via the relay device.

Further, the surveillance system of the present invention is a surveillance system including a predetermined device, a server, and a portable relay device that relays communications between the device and the server, wherein the device has a detection means that acquires predetermined monitoring information from a monitoring target wearing the device, and a monitoring information transmission means that transmits the monitoring information acquired by the detection means to the server via the relay device when interconnected with the relay device and that starts searching for an alternative network, which is an open network different from a network to the server, and transmits the monitoring information acquired by the detection means to the server by using the searched alternative network without going through the relay device when interconnection with the relay device is not possible, wherein the relay device has a relay means that receives transmission data from the device and the server and transmits the transmission data to the server and the device respectively and that transmits a withdrawal signal to the server on condition that the interconnection with the device has become impossible, and wherein the server has a control signal transmission means that transmits a control signal for controlling the device to the device via the relay device, and is configured to be capable of displaying on a management screen that the interconnection between the device and the relay device has become impossible on condition that the withdrawal signal has been received from the relay device.

Further, the surveillance system of the present invention is a surveillance system including a predetermined device, a server, and a portable relay device that relays communications between the device and the server, wherein the device has a detection means that acquires predetermined monitoring information from a monitoring target wearing the device, and a monitoring information transmission means that transmits the monitoring information acquired by the detection means to the server via the relay device when interconnected with the relay device and that starts searching for an alternative network, which is an open network different from a network to the server, and transmits the monitoring information acquired by the detection means to the server by using the searched alternative network without going through the relay device when interconnection with the relay device is not possible, wherein the relay device has a relay means that receives transmission data from the device and the server and transmits the transmission data to the server and the device respectively, and wherein the server has a control signal transmission means that transmits a control signal for controlling the device to the device via the relay device, and is configured to, on condition that a battery remaining amount of the device or a battery remaining amount of the relay device becomes equal to or less than a predetermined reference, be capable of transmitting an attention signal indicating that the battery remaining amount is low to at least one of the device or the relay device.

Here, by having the monitoring information transmission means, the device can transmit the monitoring information acquired by the detection means to the relay device when interconnected with the relay device. The monitoring information transmitted to the relay device is transmitted to the server by the relay means described later, so that the monitoring information can be monitored on the server.

Further, by having the monitoring information transmission means, the device transmits the monitoring information acquired by the detection means to the server by using the alternative network different from the network to the server via the relay device (in other words, the network when the interconnection with the relay device is possible) without going through the relay device when the interconnection with the relay device is not possible. Thus, the monitoring information can be monitored on the server.

Furthermore, the search for the alternative network by the monitoring information transmission means starts when the interconnection between the device and the relay device is not possible, in other words, the search for the alternative network is not performed when the device and the relay device are interconnected, so that power saving of the device is realized.

Further, the alternative network is an open network, so that the alternative network can be used (in other words, the monitoring information can be transmitted to the server via the alternative network) without requiring tasks for connecting to the alternative network (for example, entering an ID and a password). The "alternative network" here includes, for example, free Wi-Fi (without a password).

Further, by configuring the relay device to be portable, the area in which communications between the device and the server can be relayed is expanded compared with the case where the relay device is not portable (for example, the case where a beacon terminal is installed at a specific location), and an expansion of the area in which the monitoring information of the monitoring target can be monitored is realized.

The "portable relay device" includes, for example, electronic devices such as a smartphone, a tablet, and a laptop.

Further, by having the relay means, the relay device can receive the transmission data from the device and the server and transmit the transmission data to the server and the device respectively, so that the exchange of information between the device and the server is realized.

It is technically possible for the device and the server to exchange information directly without going through the relay device. However, when the relay device is not used, the device will take on the role of the relay device, and this makes it difficult to reduce the size and the weight of the device. Therefore, in the present invention, the reduction in size and weight of the device is realized by adopting the configuration in which the device and the server indirectly exchange information via the relay device.

Further, by having the control signal transmission means, the server can transmit the control signal for controlling the device to the device via the relay device, so that the device can be controlled from the server according to the content of monitoring for the monitoring target.

Here, when "the server is configured to, on condition that position information of the relay device associated with the monitoring target is outside a tracking area set corresponding to the monitoring target, be capable of displaying on a management screen that the position information is outside the tracking area," an alert based on the position information of the relay device (an alert directed to a person monitoring the monitoring target) can be issued.

Further, when "the server is configured to be capable of displaying on a management screen that there is a high probability that the interconnection between the device and the relay device becomes impossible on condition that the attention signal has been received from the relay device," an alert based on the attention signal (an alert directed to a person monitoring the monitoring target) can be issued.

When "the server is configured to be capable of displaying on the management screen that an alert under the condition that the attention signal has been received has been issued, when the probability that the interconnection between the device and the relay device becomes impossible is no longer high after the attention signal has been received," it can be grasped that there is no need to call attention to the monitoring target or that the attention calling to the monitoring target may be withdrawn.

Further, when "the device is configured to perform a predetermined attention operation on condition that a predetermined attention signal has been received," attention calling toward the monitoring target can be performed by the attention operation (for example, emitting an attention sound, vibrating, etc.).

Further, when "the server is configured to be capable of displaying on a management screen that the interconnection between the device and the relay device has become impossible on condition that the withdrawal signal has been received from the relay device," an alert based on the withdrawal signal (an alert directed to the person monitoring the monitoring target) can be issued.

When "the server is configured to be capable of displaying on the management screen that an alert under the condition that the withdrawal signal has been received has been issued, when the interconnection between the device and the relay device becomes possible after the withdrawal signal has been received," it can be grasped that there is no need to call attention to the monitoring target or that the attention calling to the monitoring target may be withdrawn.

Further, when "the server is configured to, on condition that a battery remaining amount of the device or a battery remaining amount of the relay device becomes equal to or less than a predetermined reference, be capable of transmitting an attention signal indicating that the battery remaining amount is low to at least one of the device or the relay device," an alert based on the attention signal (an alert directed to the monitoring target) can be issued.

Further, when "the relay device has an identification means that identifies which model the device having transmitted the monitoring information is based on a device identifier in each of a plurality of the devices with different models, the device identifier indicating the device and that identifies which monitoring information in the surveillance system the monitoring information received from the device corresponds to based on a machine learning model using model information and vital data as teacher data," it becomes possible to identify which model the device having transmitted the monitoring information is based on the device identifier in each of the plurality of devices with different models and to identify which monitoring information in the surveillance system the monitoring information received from the device corresponds to based on the machine learning model, and a highly versatile system is realized.

For example, even when the device worn by the monitoring target (or attached to the monitoring target) is replaced, an action such as transmitting the monitoring information to the server after performing data shaping in accordance with the model worn by the monitoring target (or attached to the monitoring target) becomes possible.

In order to achieve the foregoing object, the surveillance system of the present invention may be configured to be "a surveillance system including a predetermined device capable of communicating with a server via a relay device, wherein the device has a detection means that acquires predetermined monitoring information from a monitoring target wearing the device and a monitoring information transmission means that transmits the monitoring information acquired by the detection means to the server via the relay device when interconnected with the relay device and that starts searching for an alternative network, which is an open network different from a network to the server, and transmits the monitoring information acquired by the detection means to the server by using the searched alternative network without going through the relay device when interconnection with the relay device is not possible, and wherein a control signal for controlling the device is received from the server via the relay device having a relay means that receives transmission data from the device and the server and transmits the transmission data to the server and the device respectively and that transmits a withdrawal signal to the server in order to display on a management screen of the server that the interconnection with the device has become impossible on condition that the interconnection with the device has become impossible."

Meanwhile, the "device (predetermined device)" here may be any device as long as it can be worn by the monitoring target (person) or can be attached to the monitoring target (object). Examples of the device include wearable devices (computer devices attached to the wrist or leg) such as a tracking band attached to the wrist of the monitoring target (person).

Further, the "monitoring target" here is not limited to humans, but may be an animal such as a dog or a cat, and may be an object such as a drone.

Furthermore, the "monitoring information" here includes vital data obtained from the monitoring target (person) (for example, body temperature data, sleep data, pulse data, blood pressure data, blood oxygen data, electrocardiogram data, etc.) and data obtained from the monitoring target (object) (for example, information on battery remaining amount, information on whether various parts are operating normally, etc.).

Effects of Invention

The surveillance system of the present invention can realize suitable tracking more sufficiently.

BRIEF DESCRIPTION OF DRAWINGS

FIG. 4-1 is a diagram (1) explaining a method of using the tracking band surveillance system X.

FIG. 4-2 is a diagram (2) explaining the method of using the tracking band surveillance system X.

FIG. 4-3 is a diagram (3) explaining the method of using the tracking band surveillance system X.

FIG. 4-4 is a diagram (4) explaining the method of using the tracking band surveillance system X.

FIG. 4-5 is a diagram (5) explaining the method of using the tracking band surveillance system X.

FIG. 4-6 is a diagram (6) explaining the method of using the tracking band surveillance system X.

FIG. 4-7 is a diagram (7) explaining the method of using the tracking band surveillance system X.

FIG. 4-8 is a diagram (8) explaining the method of using the tracking band surveillance system X.

FIG. 4-9 is a diagram (9) explaining the method of using the tracking band surveillance system X.

FIG. 4-10 is a diagram (10) explaining the method of using the tracking band surveillance system X.

FIG. 4-11 is a diagram (11) explaining the method of using the tracking band surveillance system X.

FIG. 4-12 is a diagram (12) explaining the method of using the tracking band surveillance system X.

FIG. 4-13 is a diagram (13) explaining the method of using the tracking band surveillance system X.

FIG. 4-14 is a diagram (14) explaining the method of using the tracking band surveillance system X.

FIG. 5 is a schematic diagram for explaining a tracking band surveillance system Y.

DESCRIPTION OF EMBODIMENTS

Hereinafter, modes for carrying out the present invention (hereinafter, referred to as "embodiments") will be described. The description will be given in the following order.

1. First Embodiment
2. Second Embodiment
3. Variations

In the present embodiments, the description will be given taking an example of a case where a person who is a monitoring target (a tracking target) (referred to as a "tracking target person") wears a tracking band (an example of the predetermined device). Further, a person tracking the tracking target person is referred to as a "tracker."

1. FIRST EMBODIMENT

[Description of System Configuration]

Figure 1:
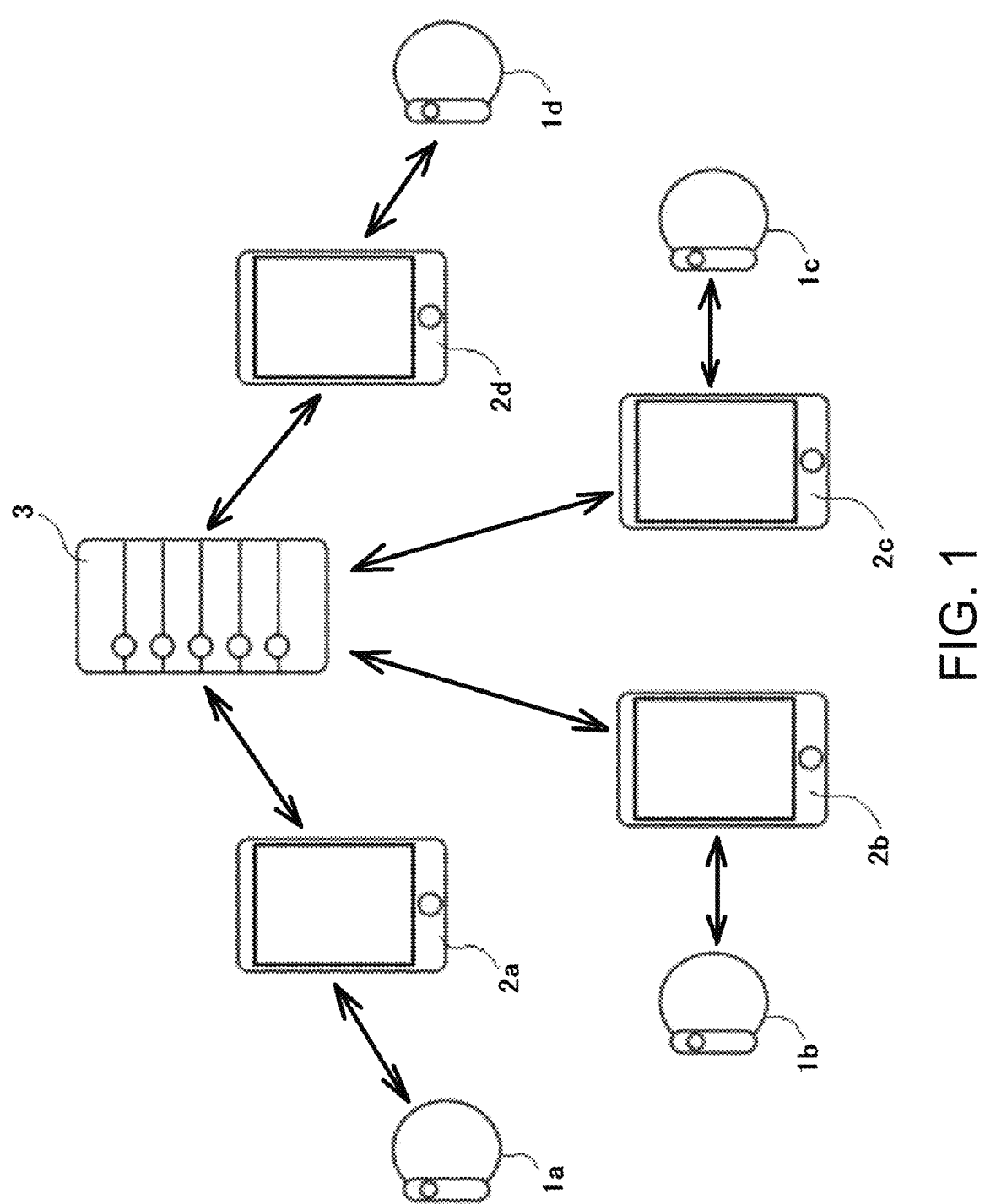
FIG. 1 is a schematic diagram (1) for explaining a tracking band surveillance system X.

FIG. 1 is a schematic diagram for explaining a tracking band surveillance system X, which is an example of a configuration example of the surveillance system of the present invention. The tracking band surveillance system X shown in FIG. 1 is composed of a tracking band 1 (1a, 1b, 1c, 1d), a smartphone 2 (2a, 2b, 2c, 2d) as a relay device, and a server 3. In the present embodiment, by installing a predetermined monitoring program on the smartphone (an example of a portable relay device), the smartphone is caused to function as a relay device (in the present embodiment, when described as a "smartphone," it means a smartphone having the function of a relay device).

The predetermined monitoring program installed on the smartphone 2 is a program for causing a predetermined information device to function as the tracking band 1 capable of communicating with the server 3 via the smartphone 2.

In the present embodiment, the tracking band worn by the tracking target person is associated with a smartphone of the tracking target person himself/herself.

Specifically, a "tracking band 1a" worn by a tracking target person A (not shown) is associated with a "smartphone 2a" owned by the tracking target person A, a "tracking band 1b" worn by a tracking target person B (not shown) is associated with a "smartphone 2b" owned by the tracking target person B, a "tracking band 1c" worn by a tracking target person C (not shown) is associated with a "smartphone 2c" owned by the tracking target person C, and a "tracking band 1d" worn by a tracking target person D (not shown) is associated with a "smartphone 2d" owned by the tracking target person D.

The tracking band then exchanges information with the server 3 via the associated smartphone.

Specifically, the "tracking band 1a" exchanges information with the server 3 via the "smartphone 2a," the tracking band 1b" via the "smartphone 2b," the "tracking band 1c" via the "smartphone 2c," and the "tracking band 1d" via the "smartphone 2d."

In the present embodiment, the description is given taking as an example a case where the tracking band and the smartphone are in one-to-one correspondence. However, two or more tracking bands may be associated with one smartphone.

Hereinafter, the "tracking band 1a," the "tracking band 1b," the "tracking band 1c," and the "tracking band 1d" are collectively referred to as the "tracking band 1." Similarly, the "smartphone 2a," the "smartphone 2b," the "smartphone 2c," and the "smartphone 2d" are collectively referred to as the "smartphone 2."

Here, the tracking band 1 is configured to be capable of interconnecting with the smartphone 2 via a wireless network. The smartphone 2 is configured to be accessible to the server 3 via the internet 4 (wireless).

It is sufficient if the "wireless network" can wirelessly connect the tracking band 1 and the smartphone 2. The "wireless network" is not particularly limited, and may be, for example, Bluetooth (registered trademark) or LoRaWAN (registered trademark).

Figure 2:
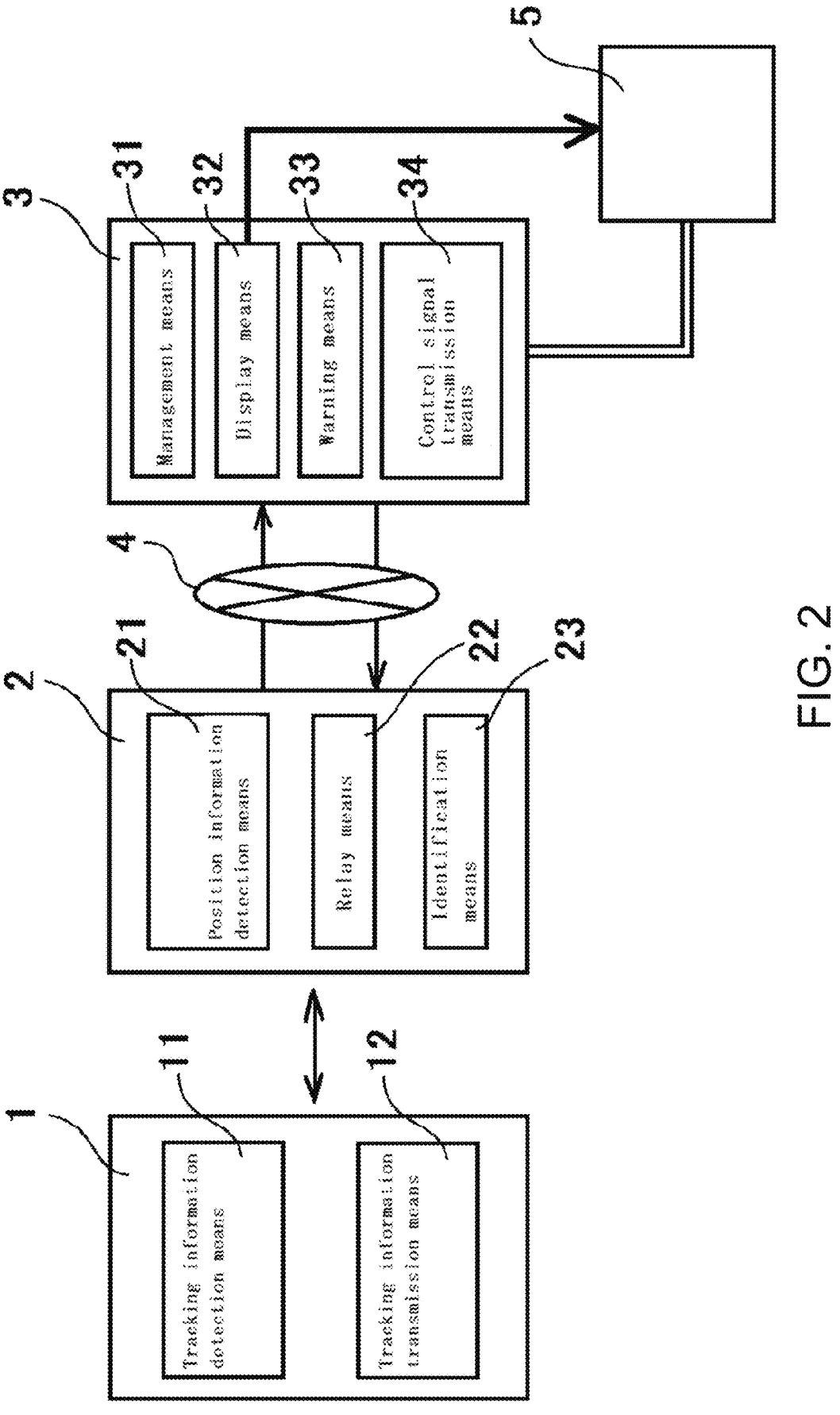
FIG. 2 is a schematic diagram (2) for explaining the tracking band surveillance system X.

Further, the tracking band 1 has a "tracking information detection means 11" and a "tracking information transmission means 12" (see FIG. 2).

Here, the tracking information detection means 11 is configured to be capable of acquiring vital data of the tracking target person wearing the tracking band 1.

The "vital data" is data indicating vital signs of the tracking target person and includes, for example, body temperature data, sleep data, pulse data, blood pressure data, blood oxygen data, electrocardiogram data, etc.

Furthermore, the numerical value acquired as the vital data includes a minimum value, a maximum value, a mode value, an average value, a deviation, a binary value, etc., during a predetermined period.

Further, the tracking information transmission means 12 is configured to be capable of transmitting the "vital data" acquired by the tracking information detection means 11 and "battery remaining amount data of the tracking band 1" to the smartphone 2.

Furthermore, the tracking information transmission means 12 starts searching for free Wi-Fi (an example of an alternative network) when the interconnection between the tracking band 1 and the smartphone 2 has become impossible (for example, when the tracking band 1 and the smartphone 2 have been separated from each other to such an extent that the wireless network cannot be connected, when the battery of the smartphone 2 has run out, etc.).

Figure 3:
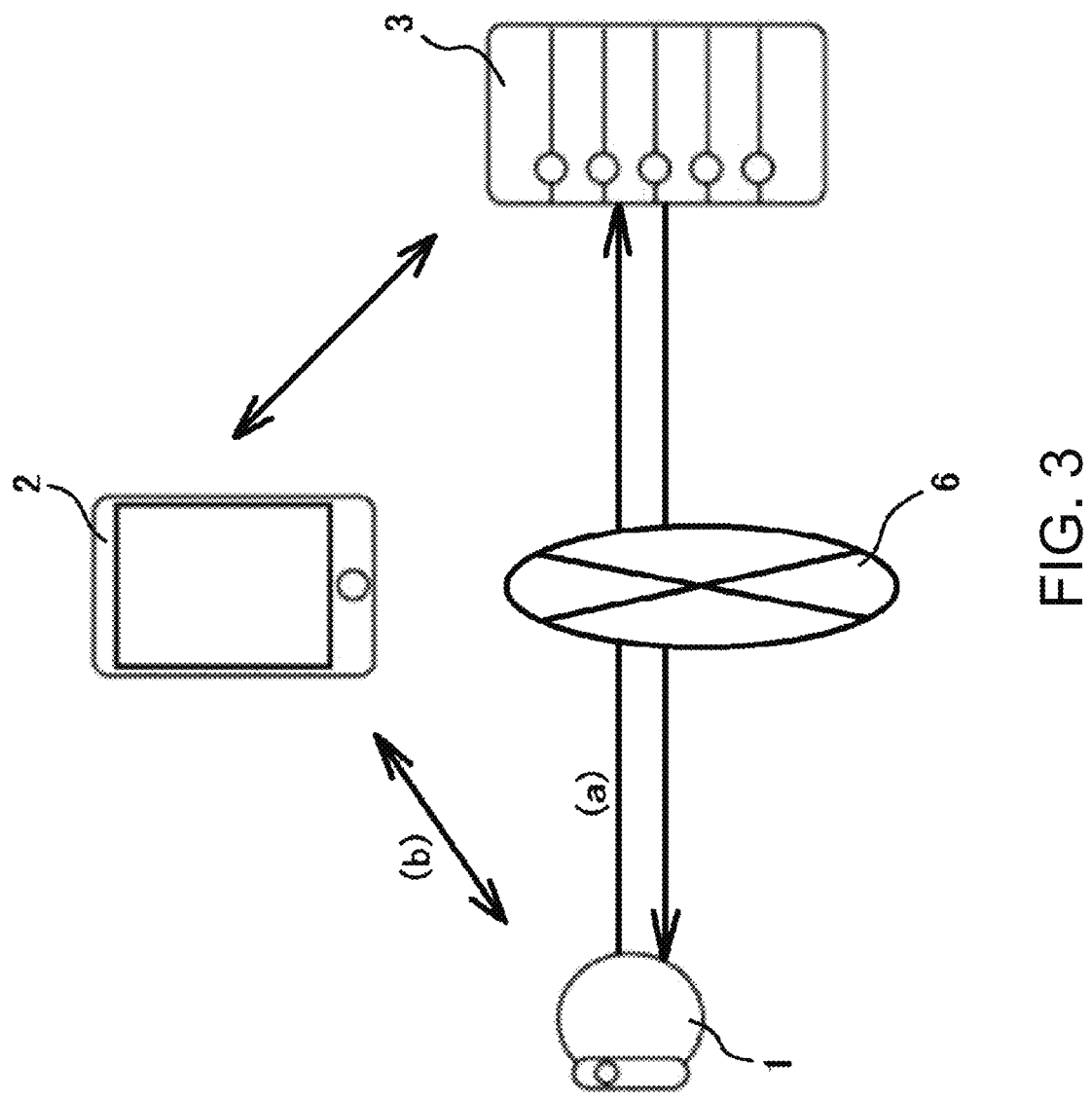
FIG. 3 is a schematic diagram (3) for explaining the tracking band surveillance system X.

When free Wi-Fi is found, as shown in FIG. 3(*a*), the tracking information transmission means 12 automatically connects to the found free Wi-Fi 6 (in other words, the tracking band 1 automatically connects to the free Wi-Fi 6 without any operation by the tracking target person), and the "vital data" acquired by the tracking information detection means 11 and the "battery remaining amount data of the tracking band 1" are transmitted to the server 3 via the free Wi-Fi 6, instead of to the smartphone 2.

Furthermore, "position information of the base station of the free Wi-Fi 6" is also transmitted to the server 3 via the free Wi-Fi 6.

When the tracking band 1 is configured to be capable of transmitting the position information of the base station of the free Wi-Fi 6 to the server 3 via the free Wi-Fi 6, the position information of the base station of the free Wi-Fi 6 can be grasped on the server 3 when the interconnection (the interconnection between the tracking band 1 and the smartphone 2) has become impossible.

Further, by grasping the position information of the base station of the free Wi-Fi 6, position information (approximate position information) of the tracking band 1 can be grasped on the server 3 even when the position information of the tracking band 1 cannot be acquired (for example, when a failure is occurring in the GPS function of the tracking band 1, etc.)

There are many free Wi-Fi 6 in the city, and when the tracking band 1 connects to any one of the plurality of free Wi-Fi 6, the search for the free Wi-Fi 6 is stopped.

In this manner, the power saving of the tracking band 1 is realized if no further search for the free Wi-Fi 6 is performed after the tracking band 1 is connected to the free Wi-Fi 6.

The tracking information transmission means 12 starts searching for the smartphone 2 simultaneously with the search for the free Wi-Fi 6 when the interconnection between the tracking band 1 and the smartphone 2 has become impossible.

When the smartphone 2 is found, as shown in FIG. 3(*b*), the interconnection between the tracking band 1 and the smartphone 2 is resumed. Once the interconnection is resumed, the "vital data" and the "battery remaining amount data of the tracking band 1" are transmitted to the smartphone 2.

The search for the smartphone 2 is performed even after the free Wi-Fi 6 and the tracking band 1 are connected. In other words, the search for the smartphone 2 is continued even after the search for the free Wi-Fi 6 is stopped.

When the smartphone 2 is found after the free Wi-Fi 6 and the tracking band 1 are connected, the connection with the free Wi-Fi 6 is cancelled and the interconnection between the tracking band 1 and the smartphone 2 is resumed. That is, the tracking information transmission means 12 is configured to give priority to the interconnection between the tracking band 1 and the smartphone 2 over the connection between the tracking band 1 and the free Wi-Fi 6.

In the present embodiment, the tracking band 1 is configured to start searching for the smartphone 2 when the interconnection with the smartphone 2 becomes impossible and to be capable of resuming the interconnection on condition that the smartphone 2 has been searched, including after the tracking band 1 has connected to the free Wi-Fi 6.

Thus, when a situation comes where the interconnection between the tracking band 1 and the smartphone 2 is possible, the interconnection can be resumed regardless of whether or not there is the connection with the free Wi-Fi 6. By giving priority to the interconnection with the smartphone 2 over the connection with the free Wi-Fi 6, the normal connection environment (the situation where the tracking band 1 and the smartphone 2 are interconnected) can be quickly restored.

By giving priority to the interconnection between the tracking band 1 and the smartphone 2, the function of the smartphone 2 can be sufficiently exhibited.

Specifically, the function of the smartphone 2, such as realizing a highly versatile system through identification by an identification means 23 described later, and realizing the control of the tracking band 1 from the server 3 by transmitting a control signal transmitted by a control signal transmission means 34 described later to the tracking band 1, can be exhibited.

Next, the smartphone 2 has a "position information detection means 12," a "relay means 22," and an "identification means 23" (see FIG. 2).

Here, the position information detection means 21 is configured to be capable of acquiring the position coordinates of the smartphone 2.

The "position coordinates" are typically acquired by positioning using GPS satellites. However, when the positioning using the GPS satellites is not possible, the number of steps, the step length, and the traveling direction of the tracking target person (the person carrying the smartphone 2) may be estimated by an acceleration sensor and a geomagnetic sensor, and the position information of the tracking target person may be cumulatively inferred and calculated from the coordinates serving as the starting point (the point where radio waves from the GPS satellites no longer reach).

The relay means 22 transmits to the server 3 "location data," which is the position coordinates acquired by the position information detection means 21 (the position coordinates of the smartphone 2), and "battery remaining amount data of the smartphone 2" together with the transmission data (the "vital data" and the "battery remaining amount data of the tracking band 1") from the tracking band 1.

The relay means 22 may also transmit other data of the tracking target person (for example, data of the number of steps, band attachment/detachment determination data, calorie consumption data, tumble determination data, etc.) to the server 3.

The "data of the number of steps," the "band attachment/detachment determination data," and the "calorie consumption data" can be calculated based on the vital data. For the "tumble determination data," the presence or absence of a tumble or a fall can be determined by tracking the acceleration of the tracking target person with the acceleration sensor and measuring a change in the position and the action of the body.

The relay means 22 is also configured to be capable of receiving the transmission data from the server 3 (specifically, data transmitted by a warning means 33 and a control signal transmission means 34 described later), performing data shaping based on a predetermined data format, and transmitting it to the tracking band 1.

The data shaping here employs a known or conventional method and there are no restrictions on the mode of the data format. It is determined according to the hardware configuration and the program configuration of the tracking band 1.

The relay means 22 is also configured to be capable of transmitting to the tracking band 1 and the server 3 an attention signal indicating the possibility that the interconnection between the tracking band 1 and the smartphone 2 becomes impossible, when there is a high probability that the interconnection between the tracking band 1 and the smartphone 2 becomes impossible (for example, when the signal from the tracking band 1 obtained via the wireless network becomes weak).

The attention signal also includes location data when the attention signal is issued.

The tracking band 1 having received the attention signal performs a predetermined attention operation (emitting an attention sound, vibrating, etc.).

The relay means 22 is further configured to be capable of transmitting to the server 3 a withdrawal signal meaning that the tracking band 1 can no longer be tracked, when the interconnection between the tracking band 1 and the smartphone 2 has become impossible. This allows the server 3 to grasp that the tracking band 1 has been withdrawn from the connection with the smartphone 2.

The withdrawal signal also includes location data of the smartphone 2 when the interconnection between the tracking band 1 and the smartphone 2 has become impossible.

The relay means 22 is also configured to be capable of transmitting an "SOS signal" to the server 3 based on the intention input of the tracking target person.

As a result, the tracker can immediately grasp on the server 3 that sudden physical illness, an accident, or the like has occurred.

The identification means 23 identifies which model the tracking band 1 having transmitted the "vital data" is based on a band identifier (not shown) indicating the tracking band 1.

The identification means 23 further identifies, based on a machine learning model, which data in the tracking band surveillance system X the "vital data" transmitted by the tracking band 1 corresponds to.

Here, teacher data of the machine learning is a combination of model information included in the band identifier of the tracking band 1 and the "vital data."

The input data in the machine learning is the "vital data" and the output data is the "model information (information indicating which model among known or conventional tracking bands 1 the relevant tracking band 1 is)."

Next, the server 3 is connected to a monitor 5 and has a "management means 31," a "display means 32," a "warning means 33," and a "control signal transmission means 34" (see FIG. 2).

Here, the management means 31 associates a tracking target identifier (not shown) indicating the tracking target person with a band identifier (not shown), and determines monitoring data based on the "vital data," the "battery remaining amount data of the tracking band 1," the "location data," and the "battery remaining amount data of the smartphone 2" transmitted from the smartphone 2.

The management means 31 also determines a "tracking area" corresponding to the band identifier.

As a result, the band identifier and the tracking area of the tracking target person are linked, and the tracking area can be defined for each tracking target person. For example, when the location data of the smartphone 2 of the tracking target person indicates the outside of the tracking area, the attention of the tracker can be called by an alert described later.

The "tracking area" may refer to a predetermined area such as a city, a town, or a village and may refer to a concentric range around predetermined position coordinates. The tracking area may refer to predetermined areas such as a plurality of cities, towns, or villages.

The management means 31 also determines a "vital normal range" corresponding to the band identifier.

As a result, the band identifier and the vital normal range of the tracking target person are linked, and the vital normal range can be defined for each tracking target person. For example, when the vital data of the tracking target person indicates a value outside the vital normal range, the attention of the tracker can be called by an alert described later.

Here, the "vital normal range" is determined by the management means 31 based on the intention input of the tracking target person. Such a "vital normal range" is individually determined for each of the tracking target identifiers.

The "vital normal range" does not have to be limited to one that is determined by the management means 31 based on the intention input of the tracking target person, and may be determined by the management means 31 based on the input of the tracker, a family medical institution, etc. Further, the "vital normal range" does not necessarily have to be determined individually, and a vital data range generally considered to be a normal range may be used.

The display means 32 outputs a signal (display signal) for displaying a management screen corresponding to the band identifier on the monitor 5, based on at least a part of the monitoring data.

The warning means 33 cooperates with the tracking band 1 to issue an alert for the tracking target person for calling attention to any abnormality relating to the tracking target person, based on at least a part of the monitoring data.

The warning means 33 further cooperates with the display means 32 to issue, on the management screen, an alert for the tracker for calling attention to any abnormality relating to the tracking target person, based on at least a part of the monitoring data.

The "alert" refers to a notification based on a known or conventional output device included in the tracking band 1, the smartphone 2, or the server 3 (a computer device). Such a notification includes visual, audible, and tactile expressions.

Hereinafter, an alert issued by the warning means 33 will be described.

(1. Alert Based on SOS Signal)

The warning means 33 issues an alert for the tracker on condition that an SOS signal has been received from the smartphone 2.

Specifically, the receipt of the SOS signal is displayed on the management screen to call attention to the tracker.

(2. Alert Based on Location Data)

The warning means 33 also issues an alert for the tracker on condition that the location data indicates the outside area of the tracking area.

The warning means 33 further may issue an alert for the tracker on condition that the location data is located in a predetermined area instead of or in addition to the fact that the location data indicates the outside area of the tracking area.

"Indicating the outside area" means that (1) at least a part of the position coordinates is out of the tracking area or that (2) at least a part of the position coordinates is out of the tracking area for a predetermined time.

(Alert Based on Vital Data)

The warning means 33 also issues an alert for the tracking target person on condition that the vital data is out of the vital normal range.

Specifically, in order to inform the tracker that the vital data is out of the normal range, the warning means 33 transmits a message (SMS, email, etc.) to the smartphone 2 and also transmits a vibration command signal to the tracking band 1 via the smartphone 2. The tracking band 1 having received the vibration command signal performs a predetermined vibration operation.

The message for informing that the vital data is out of the normal range is transmitted not only to the tracking target person but also to a registered person (for example, a family member of the tracking target person, etc.) registered for each tracking target person (each tracking target identifier).

The warning means 33 also issues an alert for the tracker on condition that the vital data is out of the vital normal range.

Specifically, the deviation of the vital data of the tracking target person from the normal range is displayed on the management screen to call attention to the tracker.

When the vital data of the tracking target person is no longer out of the normal range after the alert for the tracker by the warning means 33 is issued, the display means 32 outputs a signal (display signal) for displaying on the monitor 5 so that it can be seen that "the vital data has been out of the normal range" on the management screen.

(4. Alert Based on Attention Signal)

The warning means 33 further issues an alert for the tracker on condition that an attention signal has been received from the smartphone 2.

Specifically, a high probability that the interconnection between the tracking band 1 and the smartphone 2 becomes impossible is displayed on the management screen to call attention to the tracker.

The "location data" of the smartphone 2 is also displayed on the management screen. This allows the tracker to grasp the position of the tracking target person at the time when the attention signal has been issued. Even if the interconnection becomes impossible thereafter, the position of the tracking target person can be predicted.

When the probability that the interconnection becomes impossible is no longer high after the alert for the tracker by the warning means 33 is issued, the display means 32 outputs a signal (display signal) for displaying on the monitor 5 so that it can been seen that "the alert under the condition that the attention signal has been received has been issued" on the management screen.

This allows the tracker to grasp that the alert based on the attention signal has been cancelled.

(5. Alert Based on Withdrawal Signal)

The warning means 33 also issues an alert for the tracker on condition that a withdrawal signal has been received from the smartphone 2. Specifically, it is displayed on the management screen that the interconnection between the tracking band 1 and the smartphone 2 has become impossible, thereby calling attention to the tracker.

The "location data" is also displayed on the management screen. This allows the tracker to grasp the position of the tracking target person at the time when the withdrawal signal has been issued, and by combining it with the position information of the tracking target person at the time when the attention signal has been issued, the position of the tracking target person can be predicted.

When the interconnection becomes possible after the alert for the tracker by the warning means 33 is issued, the display means 32 outputs a signal (display signal) for displaying on the monitor 5 so that it can been seen that "the alert under the condition that the withdrawal signal has been received has been issued" on the management screen.

This allows the tracker to grasp that the alert based on the withdrawal signal has been cancelled.

Furthermore, when the data is received from the tracking band 1 via the free Wi-Fi 6 after the alert for the tracker by the warning means 33 is issued, the display means 32 outputs a signal (display signal) for displaying on the monitor 5 so that it can be seen that "the data has been received via the free Wi-Fi 6" on the management screen.

This allows the tracker to grasp that the interconnection between the tracking band 1 and the smartphone 2 has become impossible but data can be transmitted and received between the tracking band 1 and the server 3 via the free Wi-Fi 6.

(6. Alert Based on Battery Remaining Amount Data)

The warning means 33 also issues an alert for the tracking target person on condition that the battery remaining amount of the smartphone 2 is equal to or less than a predetermined reference value.

Specifically, in order to inform the tracking target person that the battery remaining amount is equal to or less than the reference value, the warning means 33 transmits a message (SMS, email, etc.) to the smartphone 2 and also transmits a vibration command signal to the tracking band 1 via the smartphone 2. The tracking band 1 having received the vibration command signal performs a predetermined vibration operation.

The warning means 33 also issues an alert for the tracker on condition that the battery remaining amount of the smartphone 2 is equal to or less than the predetermined reference value.

Specifically, it is displayed on the management screen that the battery remaining amount is equal to or less than the reference value, thereby calling attention to the tracker.

The control signal transmission means 34 determines a control signal for controlling the tracking band 1 based on the intention input (intention input of the tracker) via the management screen displayed on the monitor 5, and transmits the control signal to the tracking band 1 via the smartphone 2.

(Description of Method of Using the System)

Hereinafter, an example of a method of using the tracking band surveillance system X will be described.

FIG. 4-1 to FIG. 4-14 are diagrams for explaining the method of using the tracking band surveillance system X, and show the display screen of the monitor 5.

First, a tracker who uses the tracking band surveillance system X logs in. Specifically, the tracker logs in by entering a login ID and a password (see FIG. 4-1).

Figures 1, 4:
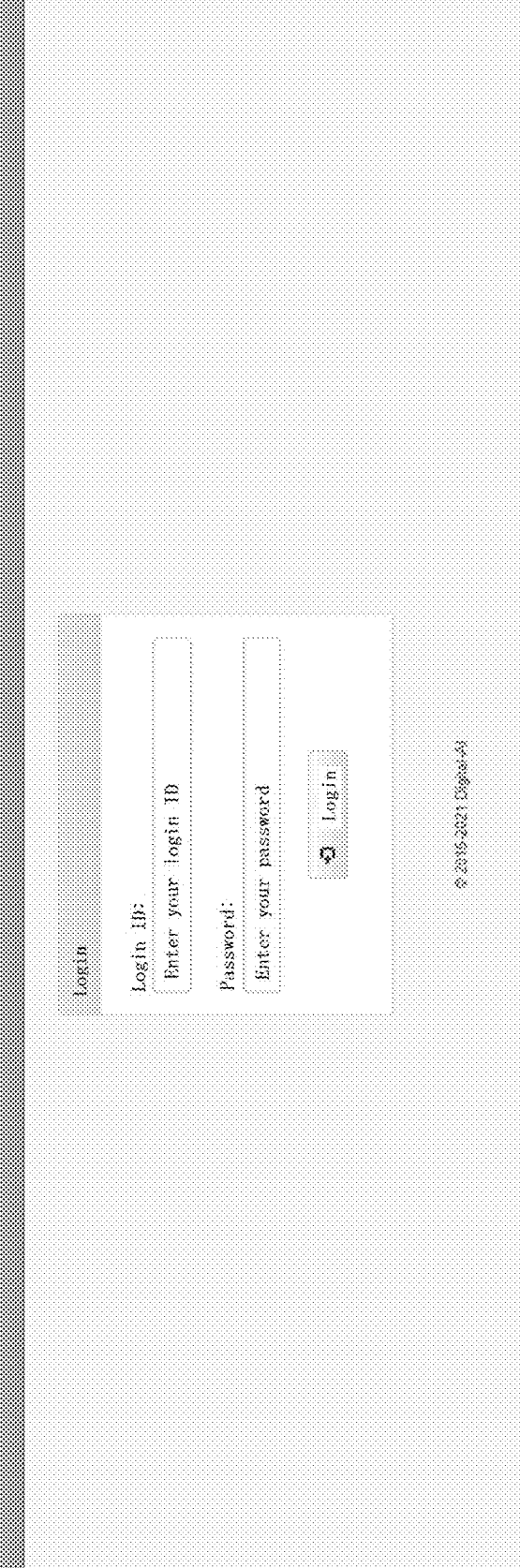
Figures 2, 4:
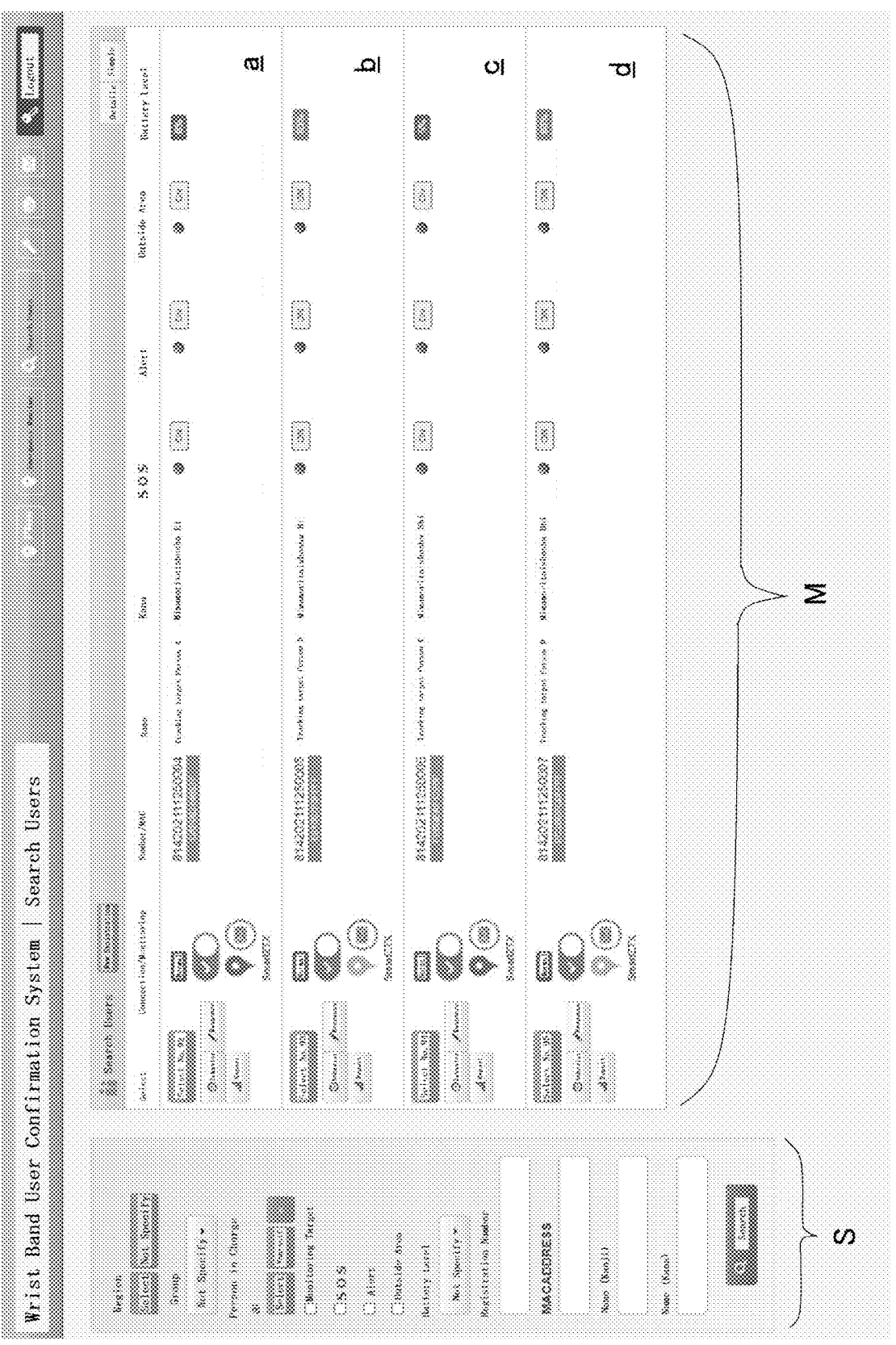
Figures 3, 4:
Figure 4:
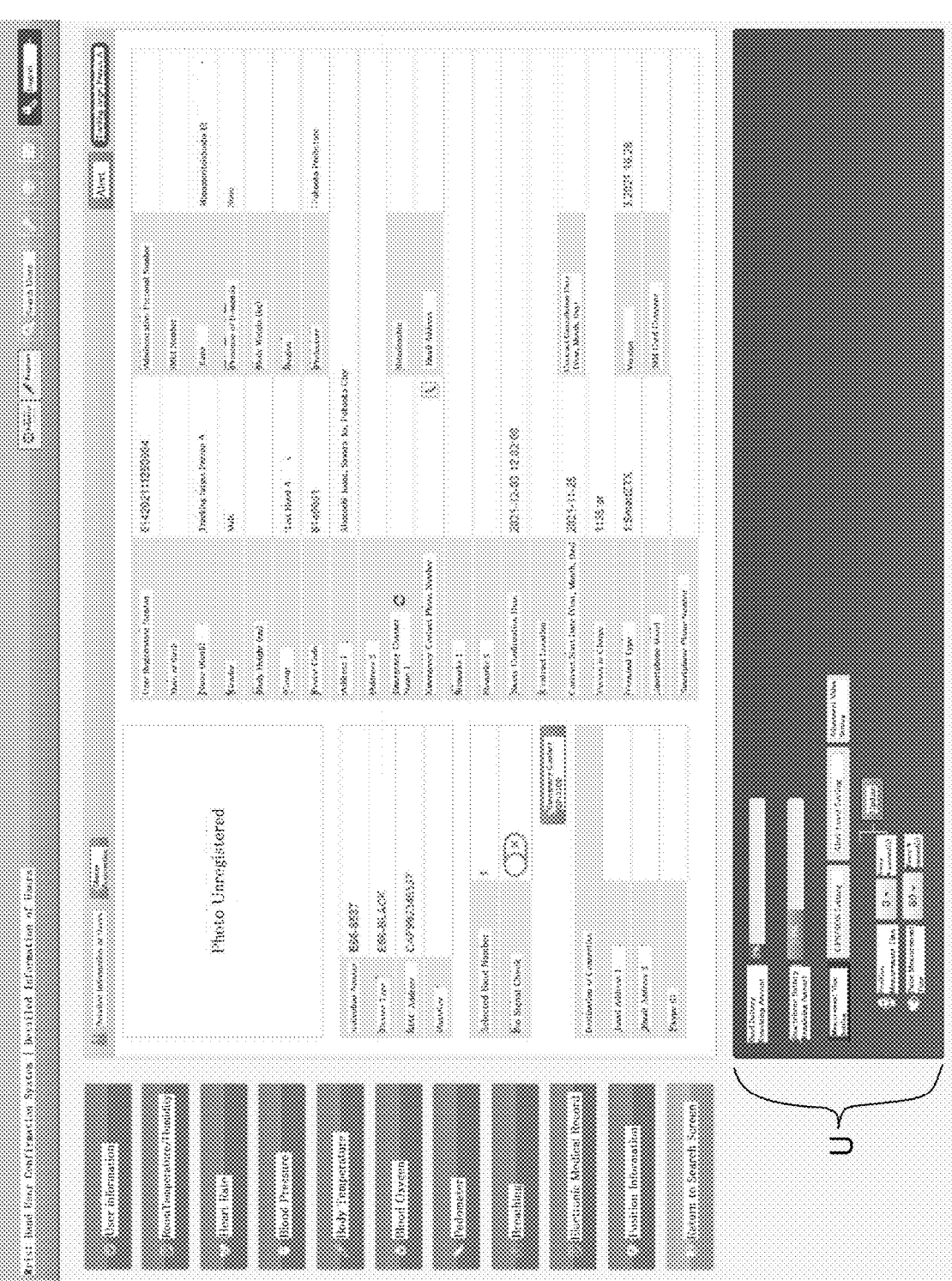

FIG. 4-2 shows the screen immediately after the login, and on the initial screen, "information on all registered users" is displayed in an area indicated by a symbol M (hereinafter, referred to as a "main screen") and "search tools" are displayed in an area indicated by a symbol S (hereinafter, referred to as a "sub screen").

Specifically, on the main screen, information on the "tracking target person A" is displayed in an area indicated by a symbol a, information on the "tracking target person B" is displayed in an area indicated by a symbol b, information on the "tracking target person C" is displayed in an area indicated by a symbol c, and information on the "tracking target person D" is displayed in an area indicated by a symbol d.

Further, by using the "search tools" on the sub screen, the users can be narrowed down by various conditions, and the result obtained by the narrowing-down search is displayed on the main screen.

For the narrowing-down search of the users, for example, by clicking on the "Select Region" button and selecting a region (for example, selecting "Fukuoka City"), information on users corresponding to the selected region is displayed on the main screen.

Similarly, by clicking on the "Specify Group" button and selecting a group (for example, selecting "Elderly Facility A"), information on users corresponding to the selected group is displayed on the main screen.

Also similarly, by clicking on the "Select Person in Charge" button and selecting a person in charge (for example, selecting "Taro MIMAMORI"), information on users corresponding to the selected person in charge is displayed on the main screen.

Further similarly, by clicking on the "Specify Battery Level" button and selecting a battery remaining amount (for example, selecting "0 to 25%"), information on users corresponding to the selected battery level is displayed on the main screen.

As another narrowing-down search of the users, for example, by checking "Monitoring Target," "SOS," "Alert," or "Outside Area," information on users corresponding to the checked items is displayed on the main screen.

As another further narrowing-down search of the users, for example, by entering "Registration Number," "MAC ADDRESS," "Name (Kanji)," or "Name (Kana)," information on users corresponding to the entered item is displayed on the main screen.

Further, on the initial screen, a detailed display is shown on the "main screen" (see FIG. 4-2), but by clicking on the "Simple" button at the top right of the screen, a simplified display is shown on the "main screen" (see FIG. 4-3).

By clicking on the "Details" button at the top right of the screen with the simplified display shown on the "main screen," the detailed display is shown on the "main screen."

Next, by clicking on a button of "Select No. 92" to "Select No. 95" among the user information displayed on the "main screen," detailed information of the relevant user information is displayed.

For example, by clicking on the "Select No. 92" button among the information of the tracking target person A, "user information (detailed information on the tracking target person A)" is displayed on the "main screen," and "menu information" is displayed on the "sub screen" (see FIG. 4-4).

Here, as the "user information," displayed are "Photo Information," "Individual Number of Tracking band 1," "Device Type of Tracking band 1," "MAC Address of Tracking band 1," "AuthKey of Tracking band 1," "Destination of Connection Alert (Email Address, Skype ID)," "User Registration Number," "Administrative Personal Number," "User's Birth Date," "IMEI Number," "User Name (Kanji)," "User Name (Kana)," "User Gender," "Presence of Dementia," "Body Height (cm)," "Body Weight (kg)," "Group," "Region," "Postal Code," "Prefecture," "Address," "Emergency Contact Name," "Relationship," "Emergency Contact Phone Number," "Emergency Contact Email Address," "Safety Confirmation Date and Time," "Contract Location," "Contract Start Date (Year, Month, Day)," "Contract Cancellation Date (Year, Month, Day)," "Person in Charge," "Terminal Type," "Terminal Version," "Smartphone Model," "SIM Card Company," "Smartphone Phone Number," etc.

In an area indicated by a symbol U (hereinafter, referred to as a "lower screen"), "Battery Remaining Amount of Tracking band 1" and "Battery Remaining Amount of Smartphone 2" are displayed.

Furthermore, on the "lower screen," various buttons of "Measurement Time Setting," "GPS/SOS Setting," "Alert Level Setting," and "Adjustment Value Setting" are displayed.

Here, by clicking on the "Measurement Time Setting" button, (1) every how may seconds the position measurement time by the tracking band 1 is performed and (2) every how many seconds the pulse measurement time by the tracking band 1 is performed can be set.

By clicking on the "GPS/SOS Setting" button, (1) ON/OFF of the GPS function of the smartphone 2 and (2) ON/OFF of the SOS function of the user can be set.

Furthermore, by clicking on the "Alert Level Setting" button, the vital normal range can be set. Specifically, (1) the upper and lower limits of the heart rate, (2) the upper and lower limits of the systolic blood pressure, (3) the upper and lower limits of the diastolic blood pressure, (4) the upper and lower limits of the body temperature, and (5) the upper and lower limits of the blood oxygen can be set.

Further, by clicking on the "Adjustment Value Setting" button, the heart rate, the systolic blood pressure, the diastolic blood pressure, the body temperature, and the adjustment value of blood oxygen (the difference between an actual value measured by a medical device and an actual value measured by the tracking band) can be set.

Figures 4, 5:
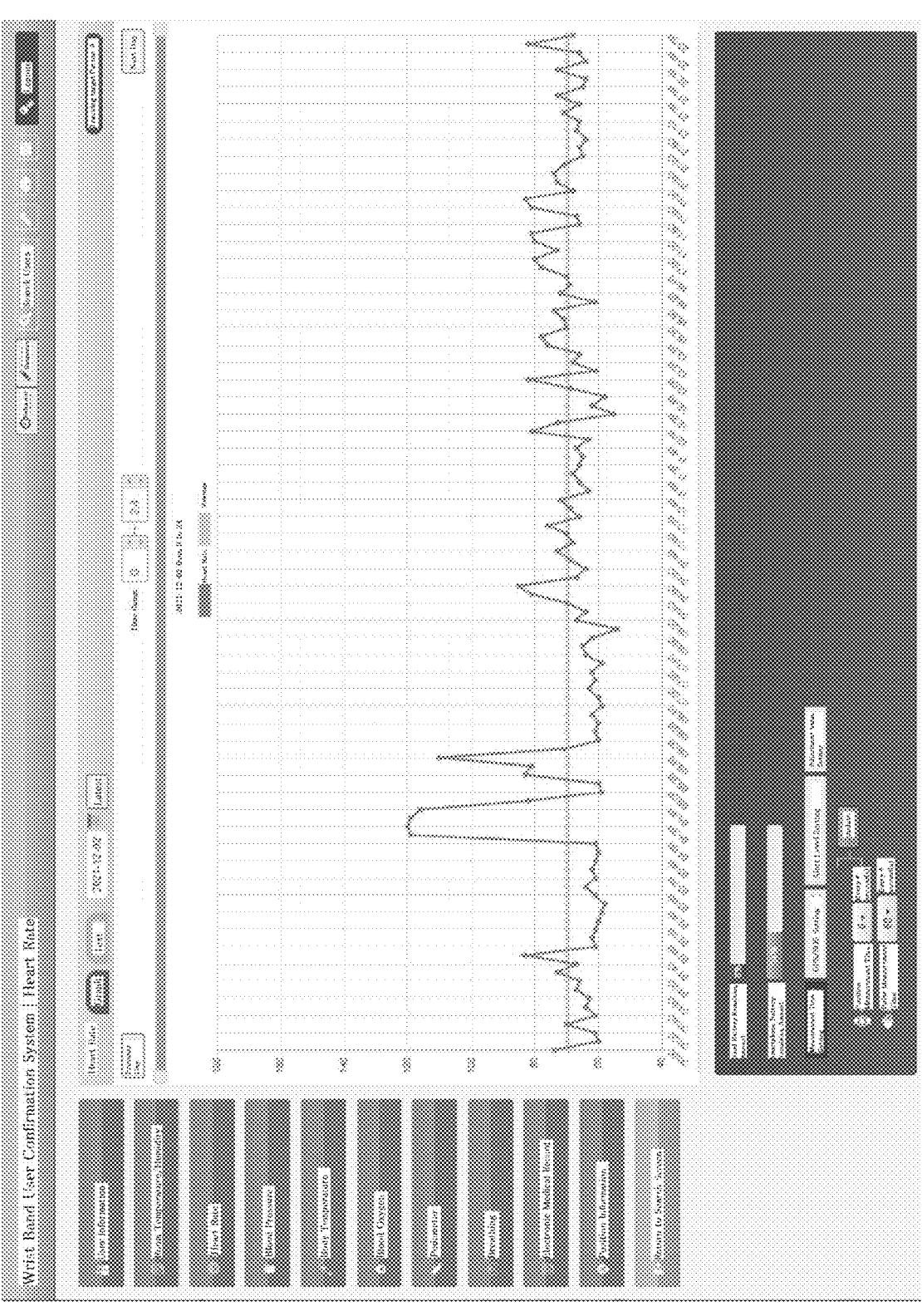

Next, by clicking on the "Heart Rate" button in the "menu screen" displayed on the "sub screen," heart rate data is displayed on the "main screen" (see FIG. 4-5).

Figures 4, 5, 6:
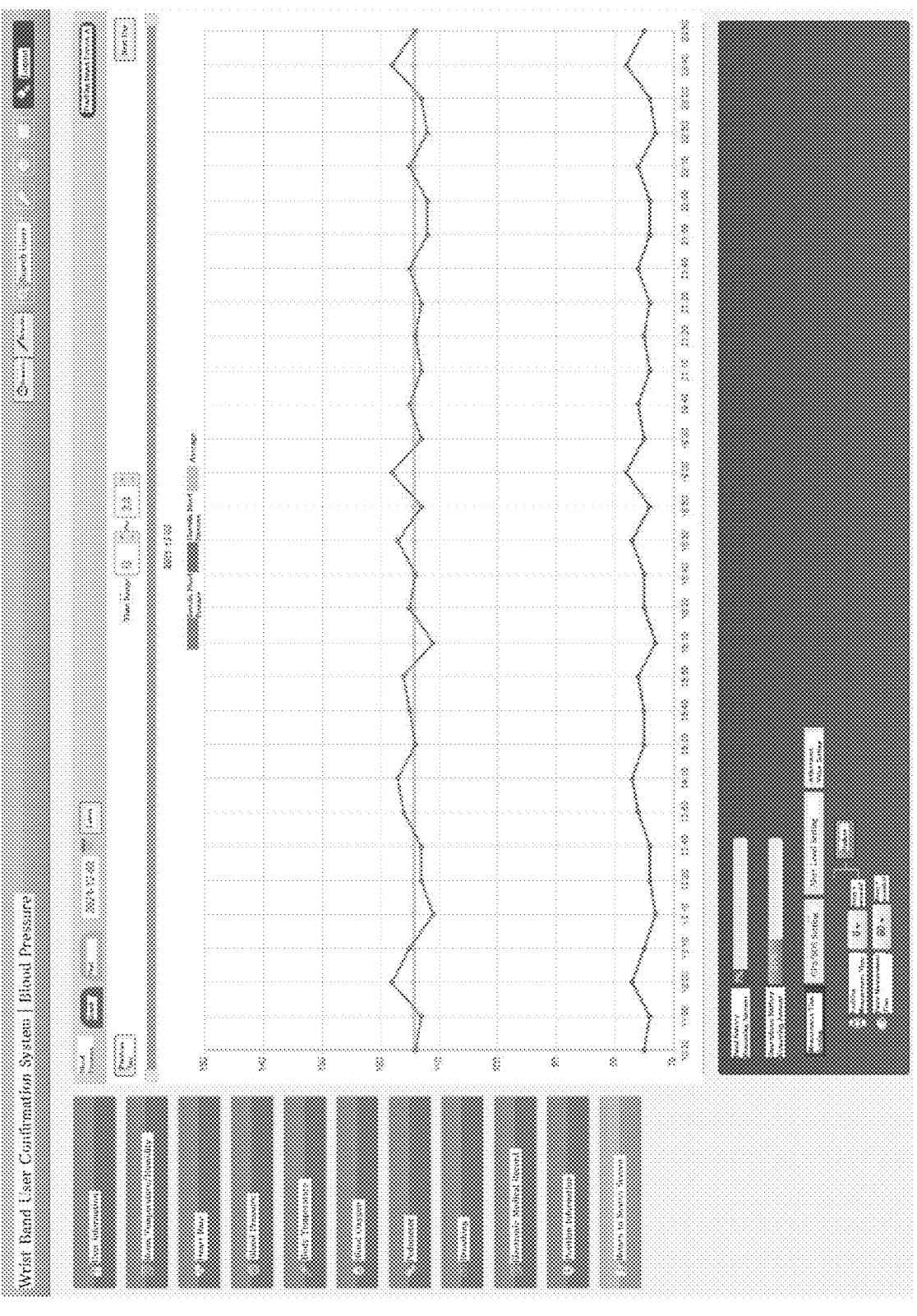
Figures 4, 5, 6, 7:
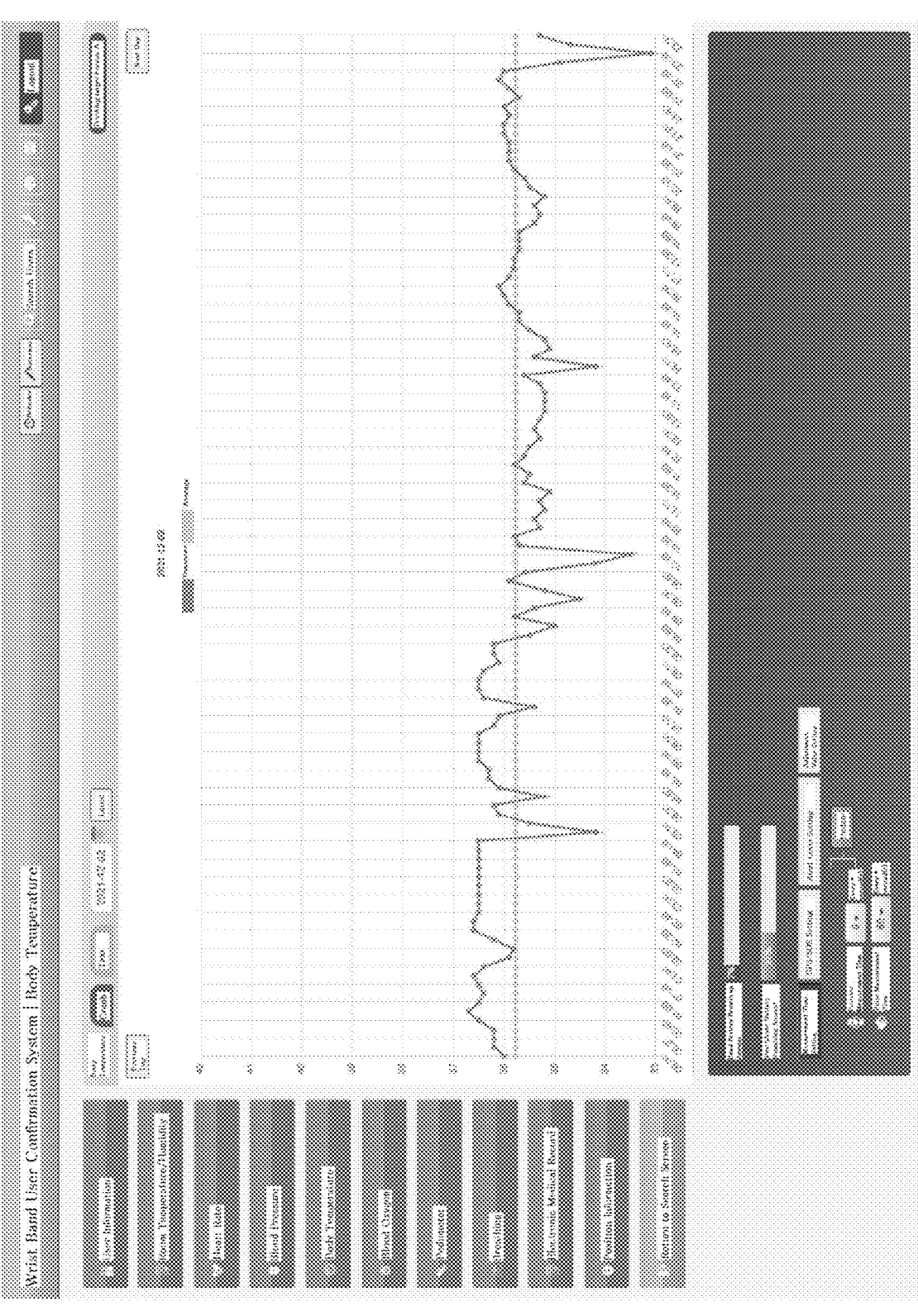
Figures 4, 5, 6, 7, 8:
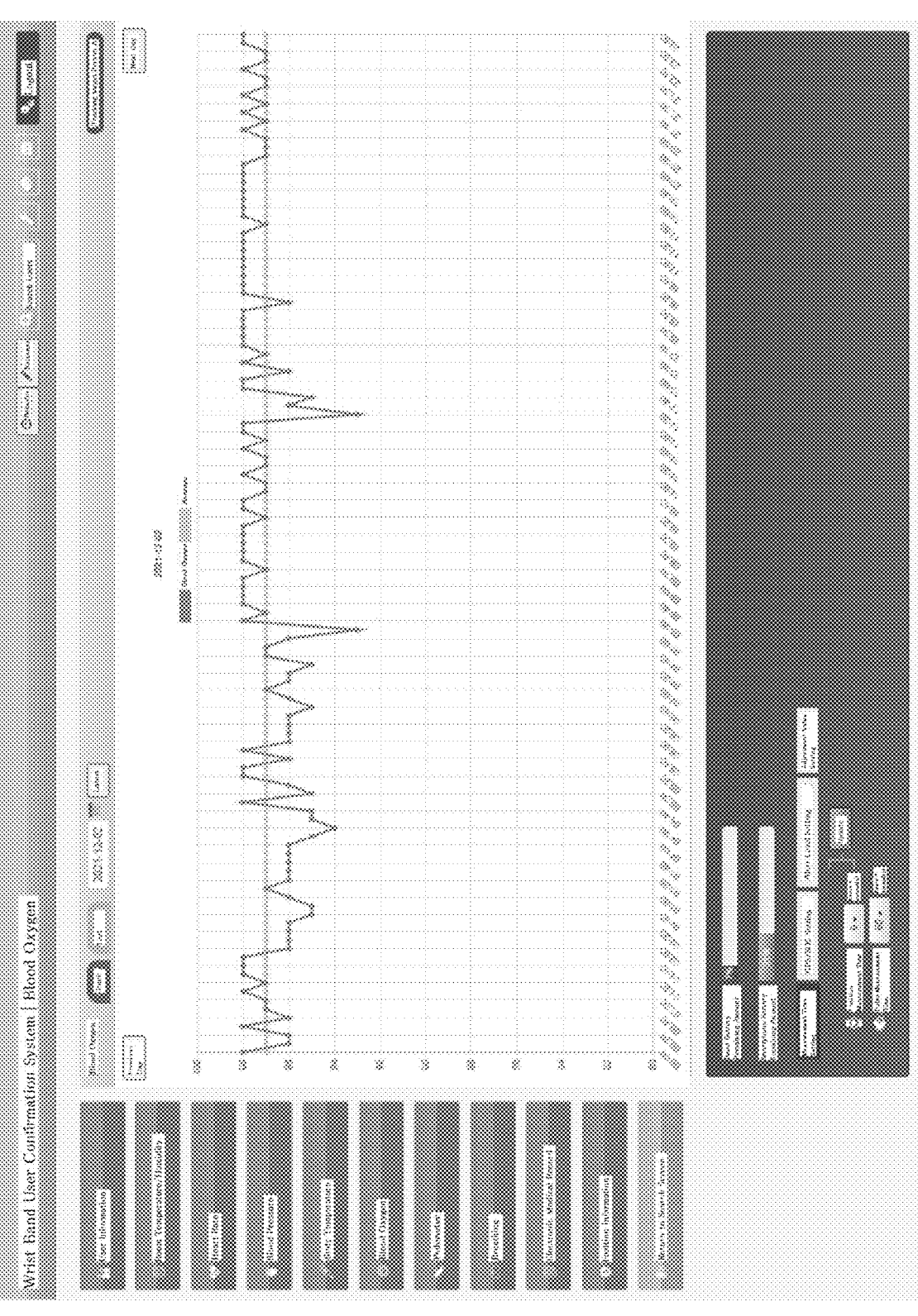
Figures 4, 5, 6, 7, 8, 9:
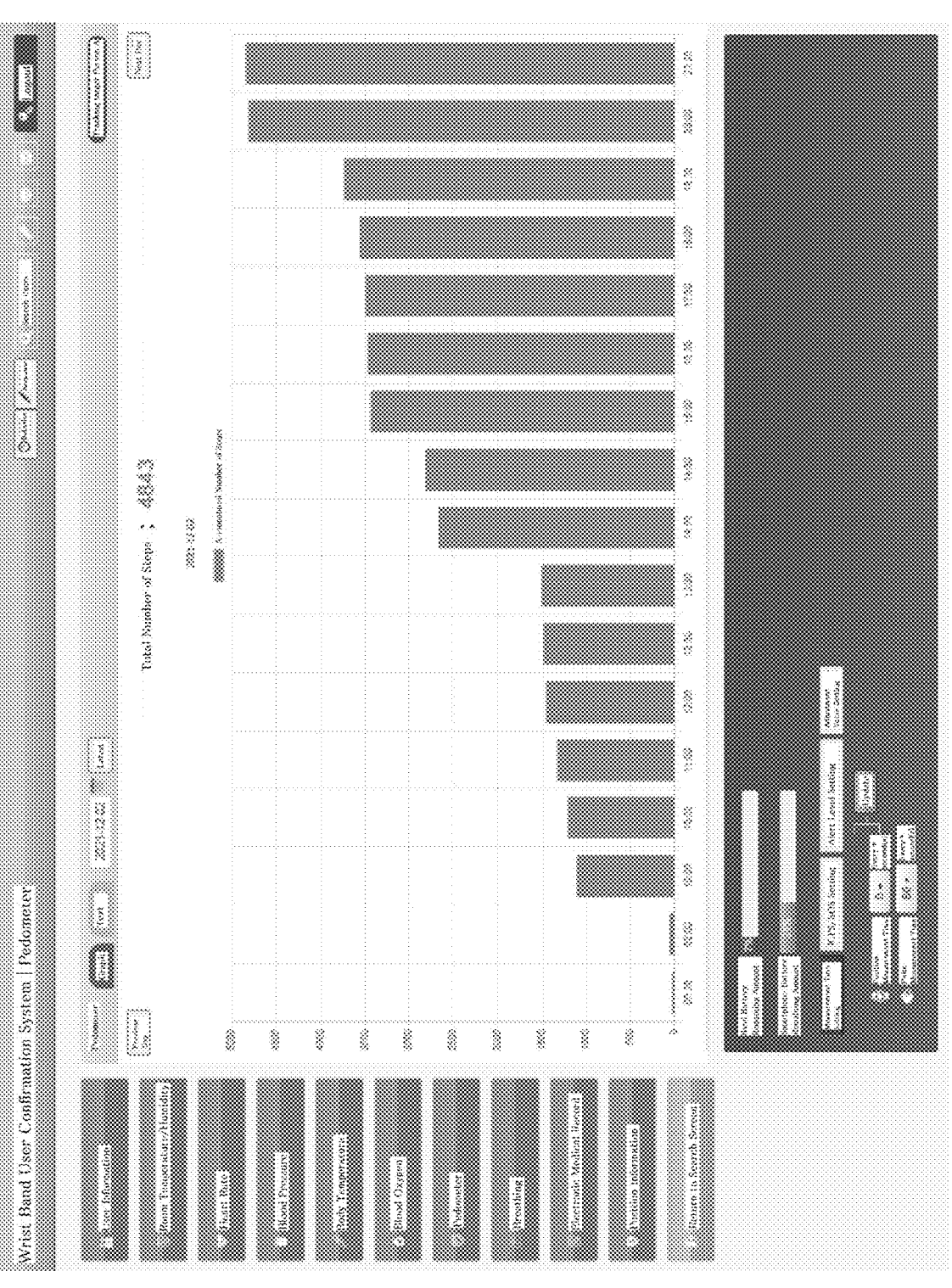
Figures 4, 5, 6, 7, 8, 9, 10:
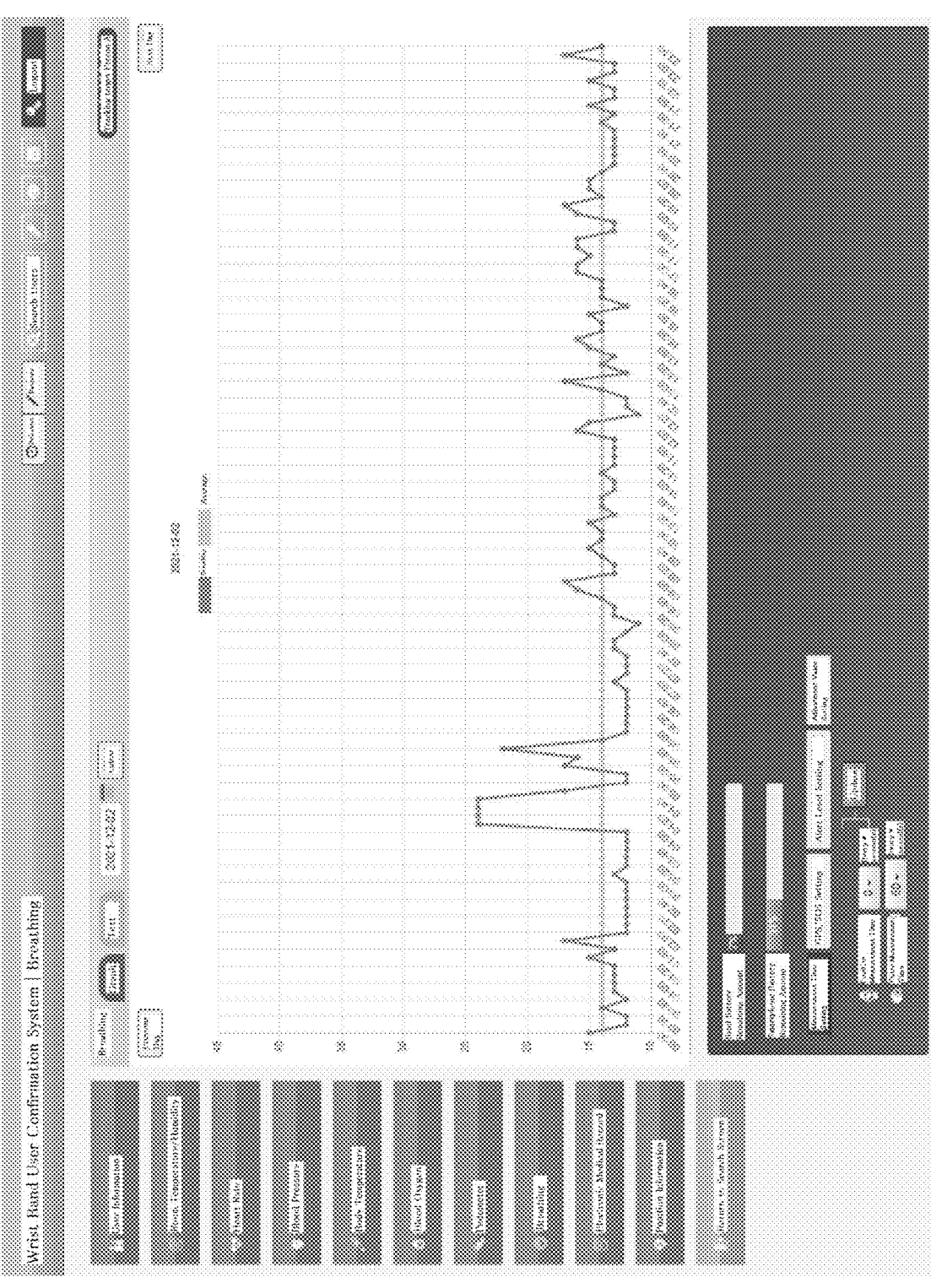
Figures 4, 5, 6, 7, 8, 9, 10, 11:
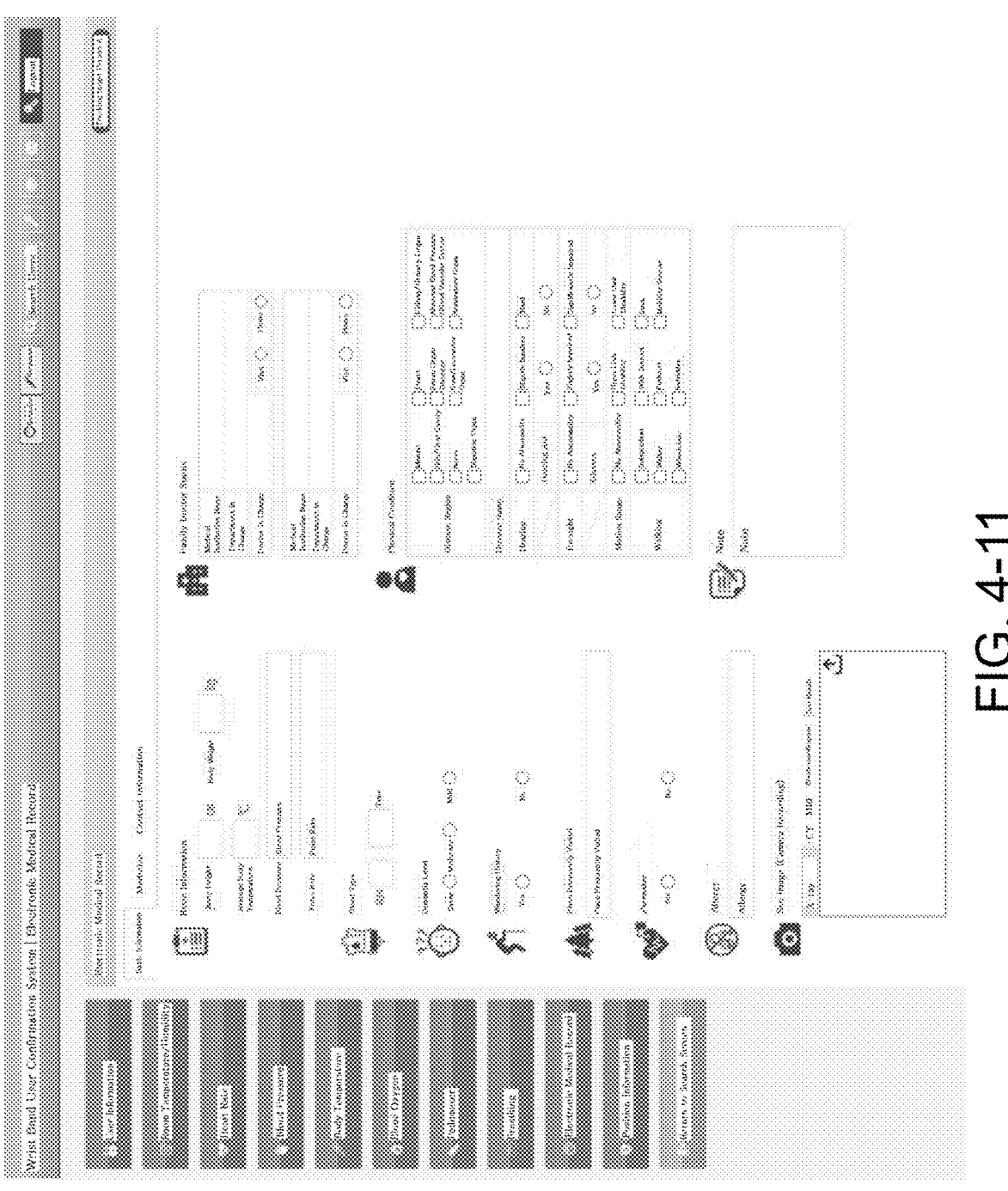
Figures 4, 5, 6, 7, 8, 9, 10, 11, 12:
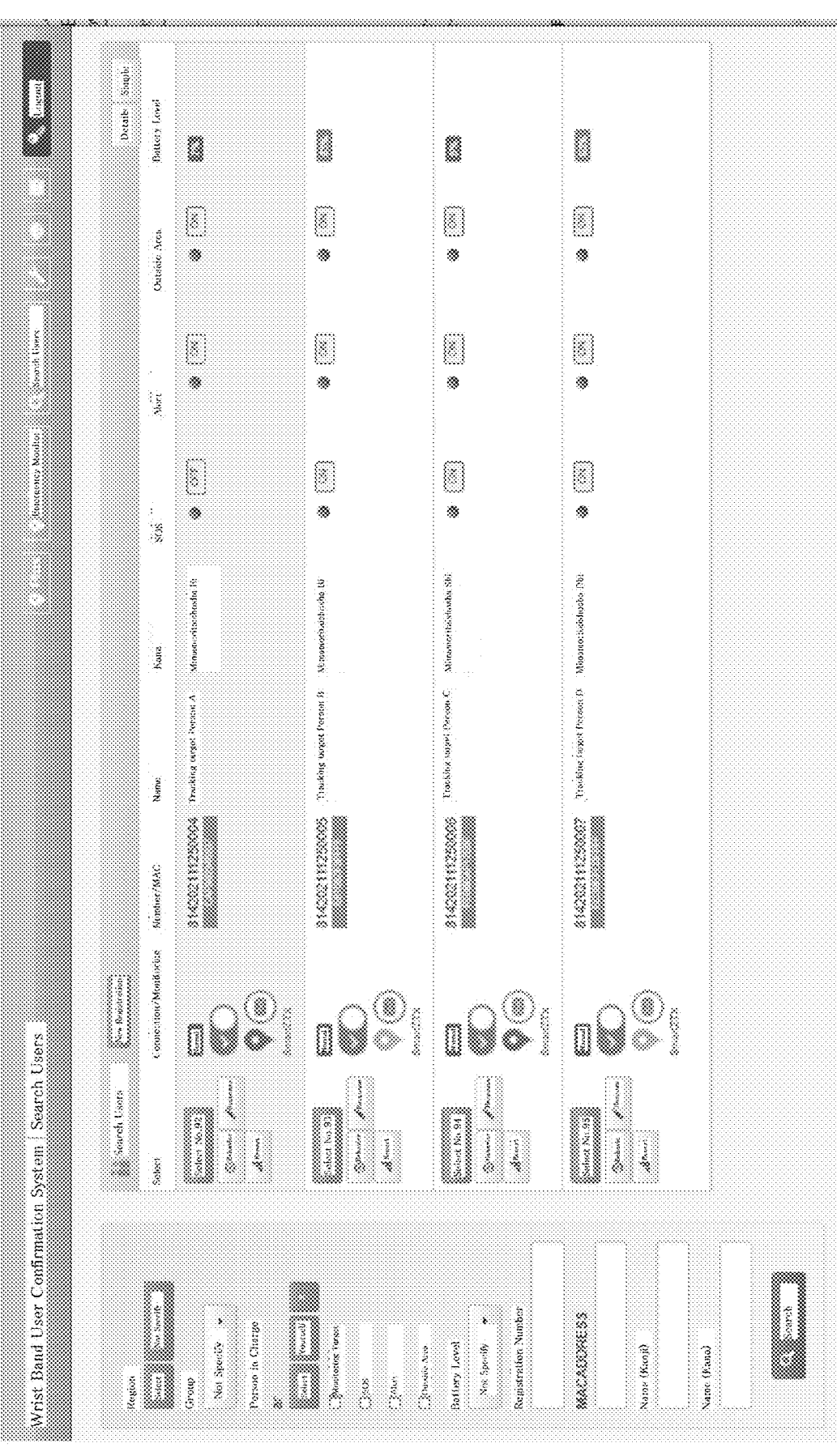
Figures 4, 5, 6, 7, 8, 9, 10, 11, 12, 13:
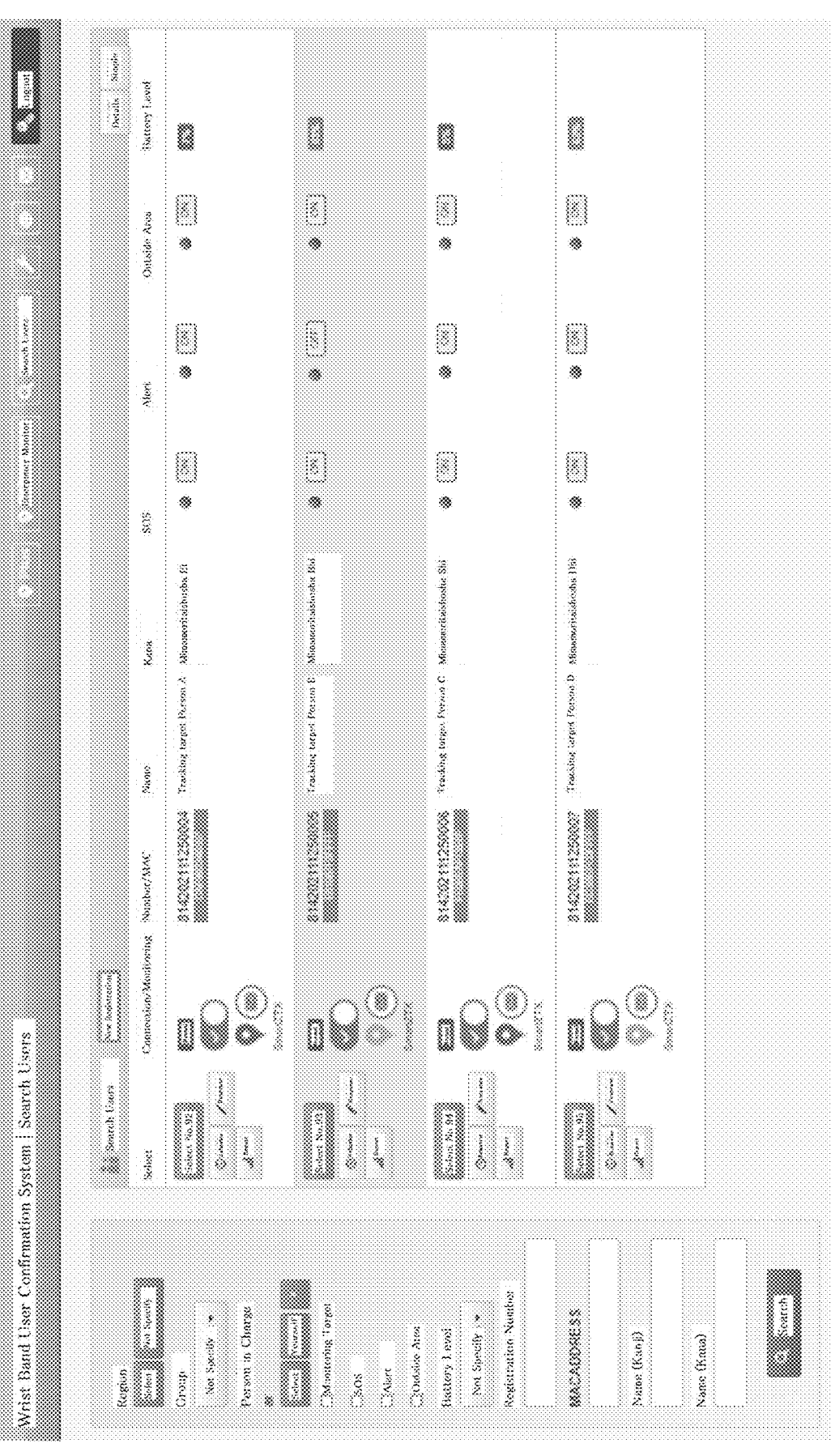
Figures 4, 5, 6, 7, 8, 9, 10, 11, 12, 13, 14:
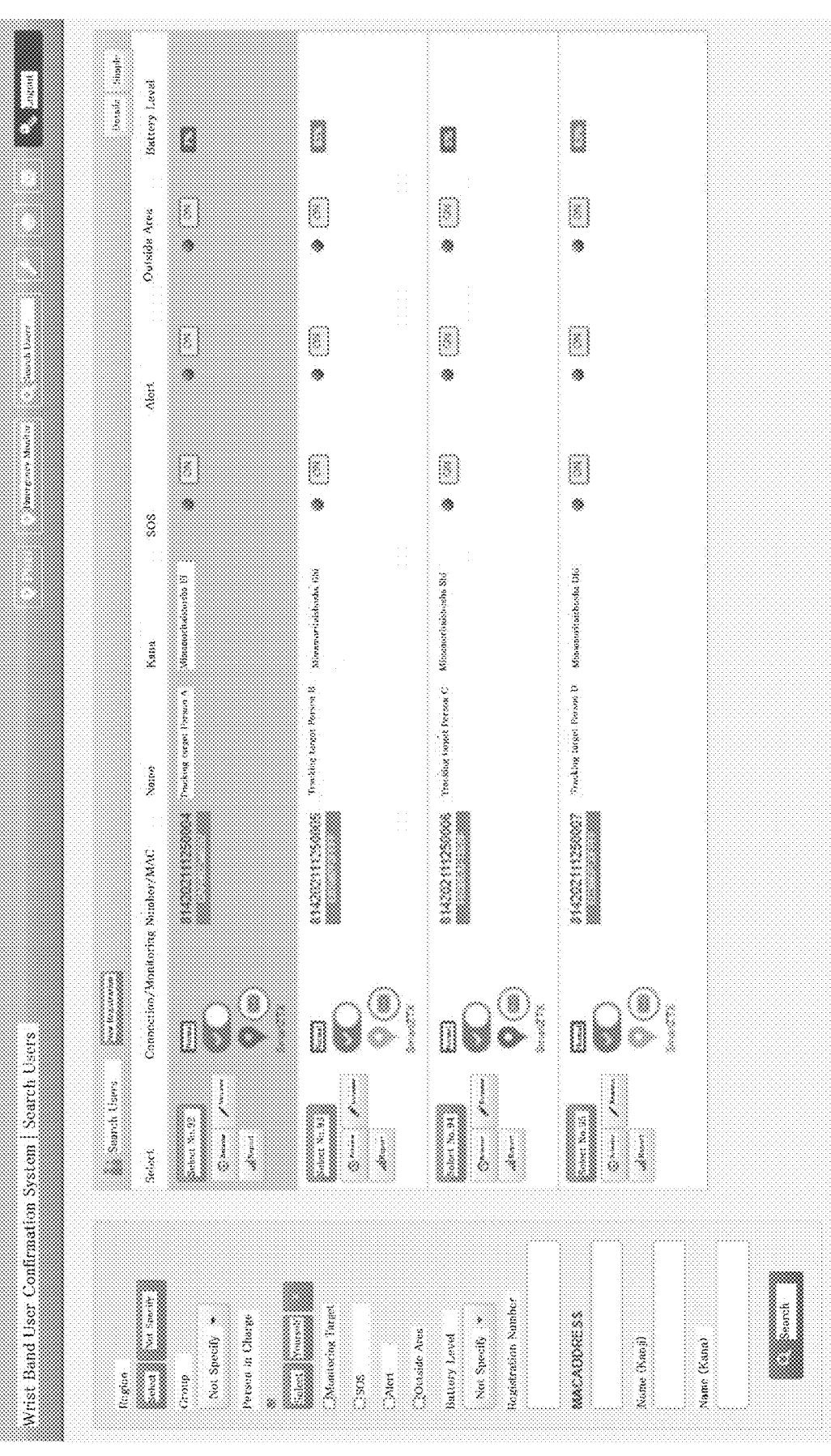
Figure 5:
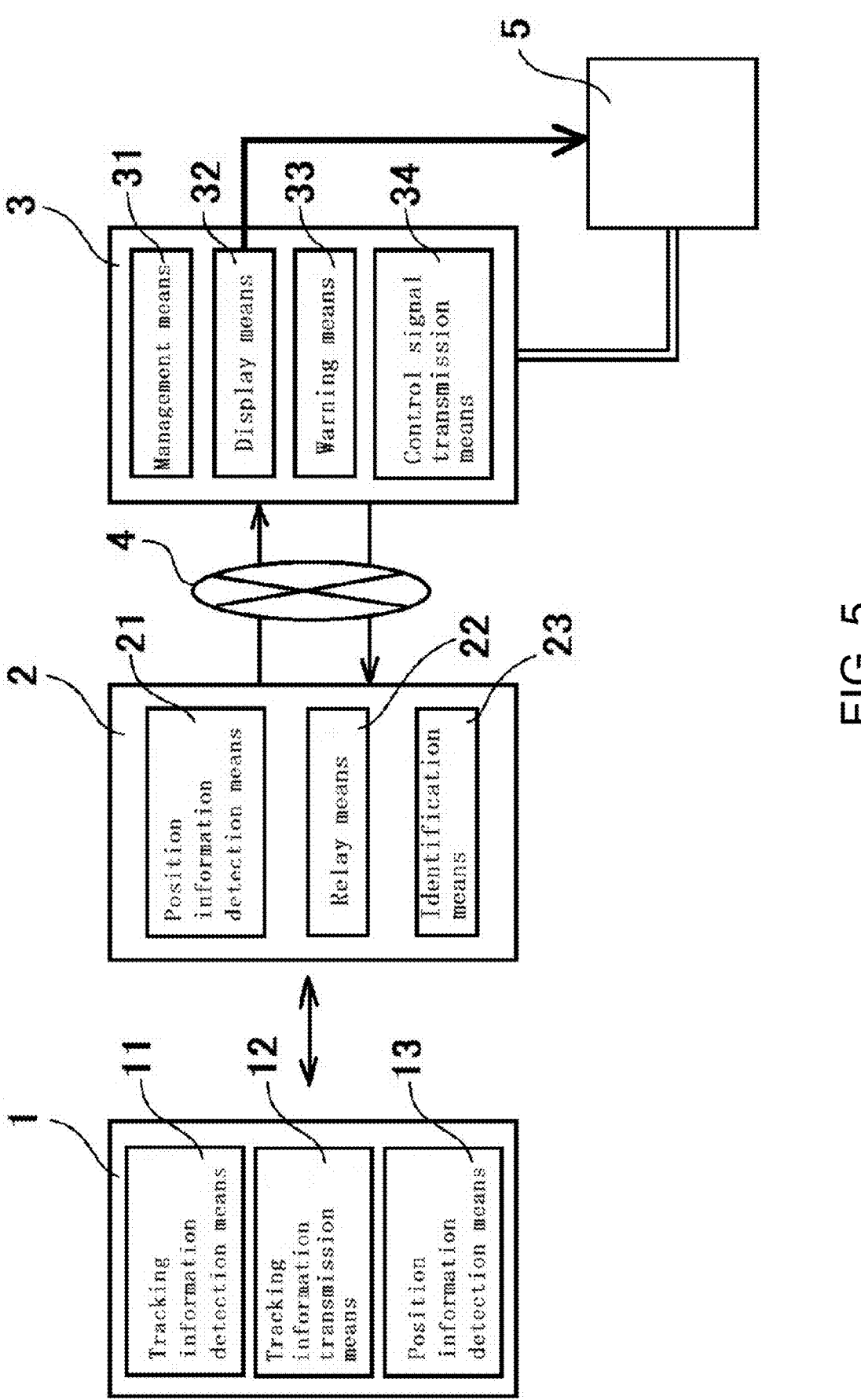

Similarly, by clicking on the "Blood Pressure" button in the "menu information" displayed on the "sub screen," blood pressure data is displayed on the "main screen" (see FIG. 4-6).

Also similarly, by clicking on the "Body Temperature" button in the "menu information" displayed on the "sub screen," body temperature data is displayed on the "main screen" (see FIG. 4-7).

Further similarly, by clicking on the "Blood Oxygen" button in the "menu information" displayed on the "sub screen," blood oxygen data is displayed on the "main screen" (see FIG. 4-8).

Also similarly, by clicking on the "Pedometer" button in the "menu information" displayed on the "sub screen," pedometer data is displayed on the "main screen" (see FIG. 4-9).

Also similarly, by clicking on the "Breathing" button in the "menu information" displayed on the "sub screen," breathing data is displayed on the "main screen" (see FIG. 4-10).

Also similarly, by clicking on the "Electronic Medical Record" button in the "menu information" displayed on the "sub screen," electronic medical record data is displayed on the "main screen" (see FIG. 4-11).

By clicking on the "Back to Search Screen" button in the "menu information" displayed on the "sub screen," the initial screen is displayed (see FIG. 4-2).

Here, when the warning means 33 issues an alert for the tracker, the corresponding user information is displayed in color.

For example, when an "SOS signal" is received from the smartphone 2 of the tracking target person A, information on the tracking target person A is displayed in color (see FIG. 4-12), and when the vital data of the tracking target person B is out of the vital normal range, information on the tracking target person B is displayed in color (FIG. 4-13).

For example, when an attention signal or a withdrawal signal is received from the smartphone 2 of the tracking target person A, information on the tracking target person A is displayed in color (see FIG. 4-14).

In the present embodiment, the display method is different for each alert in consideration of convenience of determination as to which type the alert is.

[Advantageous Effects]

In the tracking band surveillance system X to which the present invention described above is applied, the vital data is transmitted to the server 3 via the smartphone 2 carried by the tracking target person, thereby realizing an expansion of the tracking range (the range in which the warning means 33 can issue an alert based on the location data and the vital data).

The relay means 22 of the smartphone 2 transmits the attention signal to the tracking band 1 and the tracking band 1 performs an attention operation, so that the tracking target person 1 can be informed of a situation in which the interconnection between the tracking band 1 and the smartphone 2 is likely to be impossible, and it can be expected to avoid a situation in which tracking becomes impossible.

That is, the smartphone 2 having portability is adopted as the relay device, so that when the smartphone 2 is not carried (for example, left behind), it becomes impossible to track the tracking target person. Accordingly, stable tracking can be continued by calling attention to the tracking target person 1 and avoiding the tracking target person from not carrying the smartphone 2.

Furthermore, the relay means 22 of the smartphone 2 transmits the attention signal to the server 3 and the warning means 33 issues an alert for the tracker, whereby it can be expected to avoid a situation in which tracking becomes impossible.

That is, taking the alerting for the tracker as an opportunity, the tracker can call attention to the tracking target person by various means (for example, phone contact, email contact, etc.). Such attention calling avoids the tracking target person from not carrying the smartphone 2, thereby realizing a continuation of stable tracking.

Further, the relay means 22 of the smartphone 2 transmits the withdrawal signal to the server 3 and the warning means 33 issues an alert for the tracker, whereby it can be expected to escape from the "situation in which tracking is impossible" early.

That is, taking the alert for the tracker as an opportunity, the tracker can call attention to the tracking target person and a person concerned (for example, a family member) by various means (for example, phone contact, email contact, etc.). Such attention calling avoids the tracking target person from not carrying the smartphone 2, thereby realizing an early improvement in the "situation in which tracking is impossible."

Furthermore, the withdrawal signal transmitted by the relay means 22 of the smartphone 2 includes the position information of the smartphone 2, and it can be expected to be useful in search for the tracking target person.

That is, when it is impossible to make contact with the tracking target person in the "situation in which tracking is impossible," the tracking target person will be searched. At the time of such a search for the tracking target person, early detection with reference to the position information of the smartphone 2 is realized.

Even when the interconnection with the tracking band 1 and the smartphone 2 becomes impossible, resulting in the "situation in which tracking is impossible," the "vital data" and the "battery remaining amount data of the tracking band 1" can be transmitted to the server 3 via the free Wi-Fi 6, thereby resolving (resolving for the time being) the "situation in which tracking is impossible."

Furthermore, the data transmitted to the server 3 via the free Wi-Fi 6 includes the "position information of the base station of the free Wi-Fi 6," and at the time of searching for the tracking target person, early detection with reference to the position information of the base station is realized.

Further, the tracking band 1 does not include the "position information detection means" (for example, does not have the GPS function), so that the size and the weight of the tracking band 1 can be reduced and the power consumption of the tracking band 1 can be reduced.

The low power consumption of the tracking band 1 means that the battery of the tracking band 1 lasts long, and possible tracking time with a single charging is made longer.

2. SECOND EMBODIMENT

[Description of System Configuration]

FIG. 5 is a schematic diagram for explaining a tracking band surveillance system Y, which is another example of the configuration example of the surveillance system of the present invention, and similar to the tracking band surveillance system X described above, is composed of a tracking band 1, a smartphone 2, and a server 3.

In the second embodiment, only differences from the first embodiment will be described.

First, the tracking band 1 has a "position information detection means 13" in addition to a "tracking information detection means 11" and a "tracking information transmission means 13" (see FIG. 5).

The position information detection means 13 is configured to be capable of acquiring the position coordinates of the tracking band 1.

As in the case of the position information detection means 21, the "position coordinates" are typically acquired by positioning using GPS satellites, but when the positioning using the GPS satellites is not possible, the number of steps, the step length, and the traveling direction of the tracking target person (the person wearing the tracking band 1) may be estimated by an acceleration sensor and a geomagnetic sensor, and the position information of the tracking target person may be cumulatively inferred and calculated from coordinates serving as the starting point (the point where radio waves from the GPS satellites no longer reach).

In addition to "vital data" and "battery remaining amount data of the tracking band 1," the tracking information transmission means 12 transmits "location data of the tracking band 1," which is the position coordinates (position coordinates of the tracking band 1) acquired by the position information detection means 13, to the smartphone 2.

In addition, when the free Wi-Fi 6 is found after the interconnection between the tracking band 1 and the smartphone 2 becomes impossible, the tracking information transmission means 12 transmits the "vital data," the "battery remaining amount data of the tracking band 1," and the "location data of the tracking band 1" to the server 3 via the free Wi-Fi 6, instead of to the smartphone 2.

As a result, the position information of the tracking band 1 can be grasped on the server 3 when the interconnection between the tracking band 1 and the smartphone 2 has become impossible.

Next, the smartphone 2 has a "position information detection means 21," a "relay means 22," and an "identification means 23" (see FIG. 5).

The relay means 22 is configured to be capable of receiving transmission data (the "vital data," the "battery remaining amount data of the tracking band 1," and the "location data of the tracking band 1") from the tracking band 1, performing data shaping based on a predetermined data format, and transmitting it to the server 3.

It is similar to the first embodiment in that the data shaping here employs a known or conventional method and there are no restrictions on the mode of the data format.

Furthermore, the relay means 22 also transmits "battery remaining amount data of the smartphone 2" to the server 3 together with the transmission data (the "vital data," the "battery remaining amount data of the tracking band 1," and the "location data of the tracking band 1") from the tracking band 1.

An attention signal transmitted by the relay means 22 to the server 3 includes the "location data of the tracking band 1" at the time when the attention signal is issued.

Furthermore, the attention signal also includes the "location data of the smartphone 2," which is the position coordinates (position coordinates of the smartphone 2) acquired by the position information detection means 21, at the time when the attention signal is issued.

A withdrawal signal transmitted by the relay means 22 to the server 3 includes the "location data of the tracking band 1" included in the smartphone 2 when the interconnection between the tracking band 1 and the smartphone 2 has become impossible.

Furthermore, the withdrawal signal also includes the "location data of the smartphone 2" at the time when the withdrawal signal is issued.

Subsequently, the server 3 is connected to a monitor 5, and has a "management means 31," a "display means 32," a "warning means 33," and a "control signal transmission means 34" (see FIG. 5).

The management means 31 associates a tracking target identifier (not shown) with a band identifier (not shown) and determines monitoring data based on the "vital data," "battery remaining amount data of the tracking band 1," "location data of the tracking band 1," and "battery remaining amount data of the smartphone 2" transmitted from the smartphone 2.

The warning means 33 issues an alert for the tracker on condition that the location data of the tracking band 1 indicates the outside area of the tracking area.

This allows the tracker to grasp that the tracking target person has gone out of the tracking area, so that an early action to the tracking target person can be taken.

The warning means 33 also may issue an alert for the tracker on condition that the location data of the tracking band 1 is located in a predetermined area instead of or in addition to the fact that the location data of the tracking band 1 indicates the outside area of the tracking area.

The warning means 33 also issues an alert for the tracker on condition that an attention signal has been received from the smartphone 2.

Specifically, a high probability that the interconnection between the tracking band 1 and the smartphone 2 becomes impossible is displayed on the management screen to call attention to the tracker. The "location data of the tracking band 1" and the "location data of the smartphone 2" are also displayed on the management screen.

This allows the tracker to grasp the position information of the tracking target person at the time when the server 3 has received the attention signal.

The warning means 33 also issues an alert for the tracker on condition that a withdrawal signal has been received from the smartphone 2.

Specifically, it is displayed on the management screen that the interconnection between the tracking band 1 and the smartphone 2 has become impossible and the tracking band 1 can no longer be tracked, thereby calling attention to the tracker.

The "location data of the tracking band 1" and the "location data of the smartphone 2" are also displayed on the management screen. This allows the tracker to grasp the position information of the tracking target person at the time when the withdrawal signal has been received, and it can be useful in a subsequent search for the tracking target person, combined with the position information of the tracking target person at the time when the attention signal has been received.

Note that the "location data of the tracking band 1" here means the latest data included in the smartphone 2 (does not means real-time position information since the interconnection between the tracking band 1 and the smartphone 2 is not possible).

[Advantageous Effects]

In the tracking band surveillance system Y to which the present invention described above is applied, similar to the tracking band surveillance system X described above, the vital data is transmitted to the server 3 via the smartphone 2 carried by the tracking target person, thereby realizing an expansion of the tracking range (the range in which the warning means 33 can issue an alert based on the location data of the tracking band and the vital data).

The tracking band surveillance system Y is also similar to the tracking band surveillance system X described above in that stable tracking is continued by the attention signal, the "situation in which tracking is impossible" is improved early by the withdrawal signal, and the "situation in which tracking is impossible" is resolved (resolved for the time being) by the data transmission via the free Wi-Fi.

Furthermore, the withdrawal signal includes not only the position information of the smartphone 2 but also the position information of the tracking band 1, so that it can be expected to be more sufficiently useful in search for the tracking target person.

Further, the data transmitted via the free Wi-Fi 6 includes the position information of the tracking band 1, so that it can be expected to be more sufficiently useful in search for the tracking target person.

3. VARIATIONS

[Variation 1]

In the first embodiment and second embodiment described above, the case in which the smartphone 2 has the "identification means 23" has been described as an example. However, it is sufficient if the tracking band 1 having transmitted the data can be identified, and the smartphone 2 does not necessarily have to have the "identification means 23."

[Variation 2]

In the second embodiment described above, the case in which the smartphone 2 has the "position information detection means 21" has been described as an example. However, the tracking of the tracking target person can be performed by grasping the "location data of the tracking band 1," so that the smartphone 2 does not necessarily have to have the "position information detection means 21."

[Variation 3]

In the first embodiment and second embodiment described above, the case in which the tracking target person is a "person" has been described as an example. However, the target to which the surveillance system of the present invention is applied is not limited to a "person" and the tracking target person may be an "object."

The invention claimed is:

1. A surveillance system including a predetermined device, a server, and a portable relay device that relays communications between the predetermined device and the server, wherein the predetermined device has a detection means that acquires predetermined monitoring information from a monitoring target wearing the predetermined device and also acquires position information of the predetermined device, and a monitoring information transmission means that transmits the monitoring information and the position information acquired by the detection means to the server via the relay device when interconnected with the relay device and that starts searching for an alternative network, which is an open network different from a network to the server, and transmits the monitoring information and the position information acquired by the detection means to the server by using the searched alternative network without going through the relay device when interconnection with the relay device is not possible, wherein the relay device is owned by a monitoring target and has a relay means that receives transmission data from the predetermined device and the server and transmits the transmission data to the server and the predetermined device respectively, and that, on condition that the interconnection with the predetermined device has become impossible, transmits to the server a withdrawal signal, position information of the predetermined device included in the relay device when the interconnection with the predetermined device has become impossible, and position information of the relay device when the interconnection with the predetermined device has become impossible, and wherein the server is configured to display on a management screen that the interconnection between the predetermined device and the relay device has become impossible and that the predetermined device can no longer be watched over on condition that the withdrawal signal has been received from the relay device.

2. The surveillance system according to claim 1, wherein the relay device has an identification means that identifies which model the predetermined device having transmitted the monitoring information is based on a device identifier in each of a plurality of the predetermined devices with different models, the device identifier indicating the predetermined device and that identifies which monitoring information in the surveillance system the monitoring information received from the predetermined device corresponds to based on a machine learning model using model information and vital data as teacher data.

3. The surveillance system according to claim 1, wherein the server is configured to display the position information of the predetermined device and the position information of the relay device on the management screen.

4. The surveillance system according to claim 3, wherein the position information of the predetermined device displayed on the management screen is latest position information included in the relay device.

5. The surveillance system according to claim 4, wherein the server is configured to display on the management screen that an alert under the condition that the withdrawal signal has been received has been issued, when the interconnection between the predetermined device and the relay device becomes possible after the withdrawal signal has been received.

6. The surveillance system according to claim 4, wherein the relay device has an identification means that identifies which model the predetermined device having transmitted the monitoring information is based on a device identifier in each of a plurality of the predetermined devices with different models, the device identifier indicating the predetermined device and that identifies which monitoring information in the surveillance system the monitoring information received from the predetermined device corresponds to based on a machine learning model using model information and vital data as teacher data.

7. The surveillance system according to claim 3, wherein the server is configured to display on the management screen that an alert under the condition that the withdrawal signal has been received has been issued, when the interconnection between the predetermined device and the relay device becomes possible after the withdrawal signal has been received.

8. The surveillance system according to claim 3, wherein the relay device has an identification means that identifies which model the predetermined device having transmitted the monitoring information is based on a device identifier in each of a plurality of the predetermined devices with different models, the device identifier indicating the predetermined device and that identifies which monitoring information in the surveillance system the monitoring information received from the predetermined device corresponds to based on a machine learning model using model information and vital data as teacher data.

9. The surveillance system according to claim 1, wherein the server is configured to display on the management screen that an alert under the condition that the withdrawal signal has been received has been issued, when the interconnection between the predetermined device and the relay device becomes possible after the withdrawal signal has been received.

10. A surveillance system including a server that receives predetermined monitoring information acquired by a predetermined device from a monitoring target wearing the predetermined device, wherein, when the predetermined device and a portable relay device owned by the monitoring target are interconnected, the server receives transmission data from the predetermined device and the server and receives the monitoring information and position information of the predetermined device via the relay device that transmits the transmission data to the server and the predetermined device respectively, and when the interconnection between the predetermined device and the relay device has become impossible, the server receives the monitoring information and the position information of the predetermined device by using an alternative network, which is an open network different from a network at a time of the interconnection and has been searched by the predetermined device, without going through the relay device, and also receives from the relay device a withdrawal signal, position information of the predetermined device included in the relay device when the interconnection has become impossible, and position information of the relay device when the interconnection with the predetermined device has become impossible, and the server is configured to display on a management screen that the interconnection between the predetermined device and the relay device has become impossible and that the predetermined device can no longer be watched over on condition that the withdrawal signal has been received from the relay device.

11. The surveillance system according to claim 10, wherein the server is configured to display the position information of the predetermined device and the position information of the relay device on the management screen.

12. The surveillance system according to claim 11, wherein the position information of the predetermined device displayed on the management screen is latest position information included in the relay device.

13. The surveillance system according to claim 12, wherein the server is configured to display on the management screen that an alert under the condition that the withdrawal signal has been received has been issued, when the interconnection between the predetermined device and the relay device becomes possible after the withdrawal signal has been received.

14. The surveillance system according to claim 11, wherein the server is configured to display on the management screen that an alert under the condition that the withdrawal signal has been received has been issued, when the interconnection between the predetermined device and the relay device becomes possible after the withdrawal signal has been received.

15. The surveillance system according to claim 10, wherein the server is configured to display on the management screen that an alert under the condition that the withdrawal signal has been received has been issued, when the interconnection between the predetermined device and the relay device becomes possible after the withdrawal signal has been received.

\* \* \* \* \*